United States Patent
Wang et al.

(10) Patent No.: US 12,118,431 B2
(45) Date of Patent: Oct. 15, 2024

(54) TWO-DIMENSIONAL CODE ENCODING METHOD, TWO-DIMENSIONAL CODE DECODING METHOD, AND ELECTRONIC DEVICE

(71) Applicant: Huawei Technologies Co., Ltd., Shenzhen (CN)

(72) Inventors: Haoren Wang, Shanghai (CN); Dequan Yu, Hangzhou (CN); Haosheng Gao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/496,052

(22) Filed: Oct. 27, 2023

(65) Prior Publication Data
US 2024/0062027 A1    Feb. 22, 2024

Related U.S. Application Data

(63) Continuation of application No. PCT/CN2022/087178, filed on Apr. 15, 2022.

(30) Foreign Application Priority Data

Apr. 30, 2021 (CN) .......................... 202110486582.9

(51) Int. Cl.
    G06K 7/14        (2006.01)

(52) U.S. Cl.
    CPC ......... G06K 7/1486 (2013.01); G06K 7/1417 (2013.01)

(58) Field of Classification Search
    None
    See application file for complete search history.

(56) References Cited

U.S. PATENT DOCUMENTS

| 6,279,830 B1* | 8/2001 | Ishibashi .............. G06K 7/1443 235/487 |
| 2012/0211561 A1* | 8/2012 | Lieberman ............. G06Q 90/00 235/494 |
| 2017/0308779 A1* | 10/2017 | Thuries .............. G06K 7/10722 |

* cited by examiner

Primary Examiner — Kristy A Haupt
(74) Attorney, Agent, or Firm — Slater Matsil, LLP

(57) ABSTRACT

In a method, an electronic device obtains to-be-encoded text, where the to-be-encoded text includes N characters; the electronic device determines a target coding mode for each of the N characters from X optional coding modes; the electronic device groups the N characters into M character fields based on the target coding mode for each character, and determines a target coding mode for each of the M character fields, where M is less than or equal to N; the electronic device encodes the M character fields based on the target coding mode for each character field to obtain a first binary character string; and the electronic device generates, based on the first binary character string, a two-dimensional code of a version corresponding to a length of the first binary character string.

20 Claims, 15 Drawing Sheets

S101: An electronic device 100 obtains to-be-encoded text, where the to-be-encoded text includes N characters S102: The electronic device 100 determines one or more candidate coding modes for each of the N characters from X optional coding modes, and selects, from the one or more candidate coding modes, a candidate coding mode with a smallest quantity of coded bits as a target coding mode for each character, where X is a positive number S103: The electronic device 100 groups the N characters into M character fields based on the target coding mode for each of the N characters, and determines target coding modes for the M character fields, where each of the M character fields includes one or more characters S104: The electronic device 100 encodes the M character fields based on the target coding modes for the M character fields to obtain a binary character string S S105: The electronic device 100 generates a two-dimensional code of a corresponding version based on a length of the binary character string S Version 1

Version 2

S101: An electronic device 100 obtains to-be-encoded text, where the to-be-encoded text includes N characters

S102: The electronic device 100 determines one or more candidate coding modes for each of the N characters from X optional coding modes, and selects, from the one or more candidate coding modes, a candidate coding mode with a smallest quantity of coded bits as a target coding mode for each character, where X is a positive number

S103: The electronic device 100 groups the N characters into M character fields based on the target coding mode for each of the N characters, and determines target coding modes for the M character fields, where each of the M character fields includes one or more characters

S104: The electronic device 100 encodes the M character fields based on the target coding modes for the M character fields to obtain a binary character string S

S105: The electronic device 100 generates a two-dimensional code of a corresponding version based on a length of the binary character string S

FIG. 4

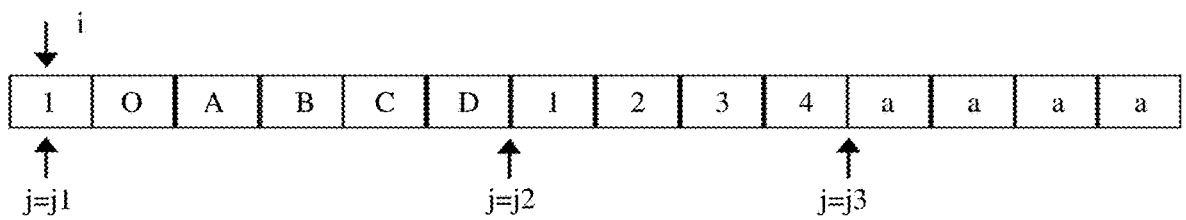

FIG. 5

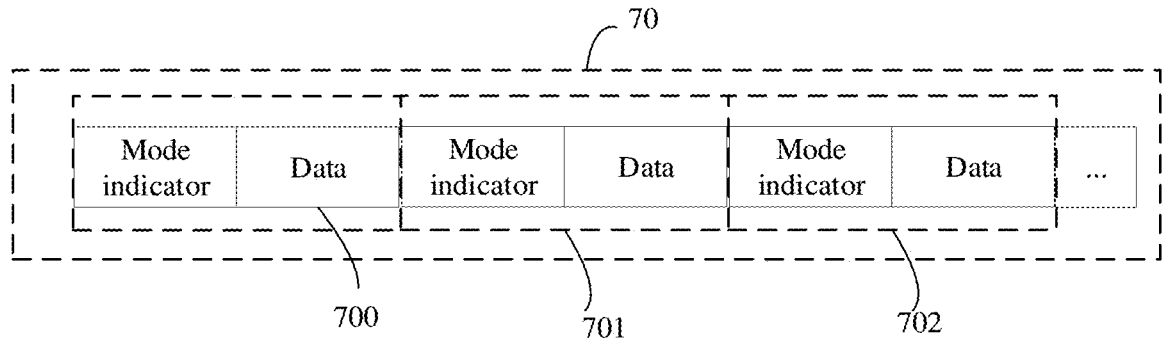

FIG. 6D

S1051: An electronic device 100 may determine a target version of a target two-dimensional code based on a length of a binary character string S1052: The electronic device 100 may allocate, based on locations of an image region, a code region, and a locator in the target version of the target two-dimensional code, the binary character string S to concentric circle regions in the code region to obtain two-dimensional code information S1053: The electronic device 100 selects a mask mode for the target two-dimensional code, and adds mask information S1054: The electronic device generates the target two-dimensional code

FIG. 7

TWO-DIMENSIONAL CODE ENCODING METHOD, TWO-DIMENSIONAL CODE DECODING METHOD, AND ELECTRONIC DEVICE

CROSS-REFERENCE TO RELATED APPLICATIONS

This application is a continuation of International Application No. PCT/CN2022/087178, filed on Apr. 15, 2022, which claims priority to Chinese Patent Application No. 202110486582.9, filed on Apr. 30, 2021. The disclosures of the aforementioned applications are hereby incorporated by reference in their entireties.

TECHNICAL FIELD

This application relates to the field of terminal artificial intelligence (AI) and a corresponding sub-field and information storage field, and in particular, to a two-dimensional code encoding method, a two-dimensional code decoding method, and an electronic device.

BACKGROUND

Nowadays, two-dimensional codes are widely used in life. Users can see two-dimensional codes everywhere in their life. For example, a user may scan a two-dimensional code by using an electronic device, to implement payment, information obtaining, account login, or the like. The two-dimensional code may store payment information, account login information, or the like. Common two-dimensional codes include a quick response (QR) code, a circular two-dimensional code, and the like. Different versions of two-dimensional codes have different information storage capacities.

An electronic device may encode, into a binary character string, information that needs to be stored in a two-dimensional code (referred to as to-be-stored information, for example, a character string), and then generate a two-dimensional code. For the to-be-stored information, a length of the obtained binary character string varies based on different encoding methods used by the electronic device. Because a capacity of the two-dimensional code is limited, the length of the binary character string obtained by the electronic device through encoding is expected to be as short as possible.

Therefore, how an electronic device encodes to-be-stored information into a binary character string with a smaller length is an issue that urgently needs to be addressed.

SUMMARY

This application provides a two-dimensional code encoding method, a two-dimensional code decoding method, and an electronic device. In the two-dimensional code encoding method provided in this application, an electronic device can encode to-be-encoded text into a shorter binary character string. In the two-dimensional code decoding method provided in this application, an electronic device can decode a two-dimensional code obtained through encoding by using the two-dimensional code encoding method in this application.

According to a first aspect, this application provides a two-dimensional code encoding method. The method may include: An electronic device obtains to-be-encoded text, where the to-be-encoded text includes N characters, and N is a positive integer. The electronic device determines a target coding mode for each of the N characters from X optional coding modes. The electronic device groups the N characters into M character fields based on the target coding mode for each character, and determines a target coding mode for each of the M character fields, where M is less than or equal to N. The electronic device encodes the M character fields based on the target coding mode for each character field to obtain a first binary character string. The electronic device generates, based on the first binary character string, a two-dimensional code of a version corresponding to a length of the first binary character string.

In the two-dimensional code encoding method provided in this embodiment of this application, the electronic device can encode the to-be-encoded text into a shorter binary character string. When a character length of the to-be-encoded text is excessively large, a binary character string obtained by using an encoding method in the conventional technology exceeds a data capacity of a two-dimensional code in the conventional technology, leading to a failure of generating a two-dimensional code. However, in the two-dimensional code encoding method in this embodiment of this application, the to-be-encoded text with a large character length can be encoded to generate a two-dimensional code.

In a possible implementation, that the electronic device determines a target coding mode for each of the N characters from X optional coding modes includes: The electronic device determines one or more candidate coding modes for a first character of the N characters from the X optional coding modes. The electronic device selects, from the one or more candidate coding modes, a candidate coding mode with a smallest quantity of coded bits as a target coding mode for the first character.

In this way, the electronic device can encode each character into a binary character string with a smaller quantity of bits. Therefore, the electronic device can encode the to-be-encoded text into a shorter binary character string.

In a possible implementation, that the electronic device groups the N characters into M character fields based on target coding modes for the N characters, and determines a target coding mode for each of the M character fields includes: The electronic device groups, into one character field, consecutive adjacent characters corresponding to a same target coding mode among the N characters, to obtain the M character fields. The electronic device determines the target coding mode for each of the M character fields based on a target coding mode for a character in each character field.

In a possible implementation, the M character fields include a first character field, the first character field includes the first character and a second character, the first character and the second character correspond to a same target coding mode, and a target coding mode for the first character field is the same as that for the first character and the second character.

In this way, the electronic device groups the N characters into character fields for encoding, so that a quantity of binary bits occupied by a mode indicator can be reduced, and a shorter binary character string can be obtained.

In a possible implementation, that the electronic device groups the N characters into M character fields based on target coding modes for the N characters, and determines a target coding mode for each of the M character fields includes: The electronic device groups, into one character field, consecutive adjacent characters that correspond to a same target coding mode and whose quantity is greater than a preset quantity among the N characters, to obtain the M character fields. The electronic device determines the target coding mode for each of the M character fields based on a target coding mode for a character in each character field.

In this way, the electronic device can group the N characters into fewer character fields, and only one mode indicator needs to be used for each character field. Compared with a case in which one character is one character field, a binary character string obtained by the electronic device includes fewer mode indicators. In this way, a quantity of bits of mode indicators can be reduced. Therefore, the electronic device can obtain a shorter binary character string.

In a possible implementation, the M character fields include a second character field, and a quantity of characters in the second character field is greater than or equal to the preset quantity.

In a possible implementation, that the electronic device groups the N characters into M character fields based on target coding modes for the N characters, and determines a target coding mode for each of the M character fields includes: The electronic device starts counting from a $1^{st}$ character of the N characters. When a $(u-1)^{th}$ character is counted, the electronic device determines that a quantity of characters is greater than or equal to a preset quantity, and when the $(u-1)^{th}$ character and a $u^{th}$ character correspond to different target coding modes, the electronic device groups the $1^{st}$ character to the $(u-1)^{th}$ character of the N characters into one character field, to obtain the M character fields. The electronic device determines the target coding mode for each of the M character fields based on a target coding mode for a character in each of the M character fields.

In this way, the electronic device can group the N characters into fewer character fields, and only one mode indicator needs to be used for each character field. Compared with a case in which one character is one character field, a binary character string obtained by the electronic device includes fewer mode indicators. In addition, a quantity of coded bits in a target coding mode for a character field can be reduced. In this way, the electronic device can obtain a shorter binary character string.

In a possible implementation, the M character fields include the first character field, and that the electronic device determines the target coding mode for each of the M character fields based on a target coding mode for a character in each character field includes: The electronic device determines that the target coding mode for the first character and the second character in the first character field is a first target coding mode. The electronic device uses the first target coding mode as the target coding mode for the first character field.

In a possible implementation, the M character fields include the first character field, and that the electronic device determines the target coding mode for each of the M character fields based on a target coding mode for a character in each character field includes: The electronic device determines that a target coding mode for the first character in the first character field is a first target coding mode, and a target coding mode for the second character in the first character field is a second target coding mode, where a quantity of coded bits in the first target coding mode is greater than that in the second target coding mode, a coding index table corresponding to the first target coding mode includes the second character, and the X optional coding modes include the first target coding mode and the second target coding mode. The electronic device uses the first target coding mode as the target coding mode for the first character field.

In a possible implementation, the M character fields include the first character field, and that the electronic device determines the target coding mode for each of the M character fields based on a target coding mode for a character in each character field includes: The electronic device determines that a target coding mode for the first character in the first character field is a first target coding mode, and a target coding mode for the second character in the first character field is a second target coding mode, where the first target coding mode is different from the second target coding mode, a coding index table corresponding to the first target coding mode does not include the first character, a coding index table corresponding to the second target coding mode does not include the second character, a quantity of coded bits corresponding to a third target coding mode is greater than that corresponding to the first target coding mode and the second target coding mode, and the X optional coding modes include the first target coding mode, the second target coding mode, and the third target coding mode. The electronic device uses the third target coding mode as the target coding mode for the first character field.

In a possible implementation, the first binary character string includes a second binary character string, the second binary character string is obtained by encoding the first character field, and the second binary character field includes a mode indicator for the target coding mode for the first character field, a character length indicator for the first character field, and a binary character string obtained by encoding a character in a first character string based on a target coding mode for the first character string.

In a possible implementation, the N characters include one or more of a numeric character, an uppercase letter character, a lowercase letter character, a special character, and an escape character, and the numeric character, the uppercase letter character, the lowercase letter character, the special character, and the escape character correspond to different target coding modes with smallest quantities of coded bits.

In a possible implementation, each of the X optional coding modes corresponds to one coding index table; the coding index table includes a first coding index table, a second coding index table, a third coding index table, a fourth coding index table, a fifth coding index table, a sixth coding index table, a seventh coding index table, and an eighth coding index table; the first coding index table includes the numeric character; the second coding index table includes the numeric character and the uppercase letter character; the third coding index table includes the numeric character and the lowercase letter character; the fourth coding index table includes the uppercase letter character and the special character; the fifth coding index table includes the lowercase letter character and the special character; the sixth coding index table includes the numeric character, the uppercase letter character, and the special character; the seventh coding index table includes the numeric character, the lowercase letter character, and the special character; and the eighth coding index table includes the numeric character, the uppercase letter character, lowercase letter character, and the special character.

In a possible implementation, the two-dimensional code includes a two-dimensional code of a first version, a two-dimensional code of a second version, a two-dimensional code of a third version, a two-dimensional code of a fourth version, a two-dimensional code of a fifth version, and a two-dimensional code of a sixth version, and the two-dimensional code of the first version, the two-dimensional code of the second version, the two-dimensional code of the third version, the two-dimensional code of the fourth version, the two-dimensional code of the fifth version, and the two-dimensional code of the sixth version have different data capacities.

In a possible implementation, the two-dimensional code is a circular two-dimensional code, the circular two-dimensional code includes a code region including a plurality of concentric circles, and a ring of each of the plurality of concentric circles includes a plurality of code elements.

According to a second aspect, a two-dimensional code decoding method is provided. The method may include: An electronic device obtains a to-be-decoded two-dimensional code, where the to-be-decoded two-dimensional code indicates first information. The electronic device obtains mode indication information from the to-be-decoded two-dimensional code. The electronic device determines a coding mode for the to-be-decoded two-dimensional code from the mode indication information, where the electronic device stores one or more mapping relationship tables, and the mapping relationship table includes the mode indication information and a coding mode corresponding to the mode indication information. The electronic device decodes the to-be-decoded two-dimensional code based on the coding mode to obtain the first information.

In this way, in the two-dimensional code decoding method provided in this application, the electronic device can decode two-dimensional codes corresponding to different coding modes.

In a possible implementation, the to-be-decoded two-dimensional code includes a code region, and that the electronic device determines mode indication information from the to-be-decoded two-dimensional code specifically includes: The electronic device obtains the mode indication information from a code element that stores the mode indication information in the code region. In this way, the electronic device can obtain the mode indication information.

In a possible implementation, before the electronic device obtains the mode indication information from the code element that stores the mode indication information in the code region, the method includes: The electronic device obtains version information of the to-be-decoded two-dimensional code, and determines a target version of the to-be-decoded two-dimensional code based on the version information, where the target version indicates coordinate information of each storage location in the code region of the to-be-decoded two-dimensional code. The electronic device determines, based on the coordinate information of each storage location, a binary value corresponding to a storage location occupied by each of a plurality of code elements in the code region of the to-be-decoded two-dimensional code. In this way, the electronic device can accurately determine a binary value corresponding to each code element in the code region.

Optionally, binary data may be 0 or 1.

In a possible implementation, the electronic device may determine the version information of the to-be-decoded two-dimensional code based on a distance between any two locators in the to-be-decoded two-dimensional code. Different version information corresponds to different distances between any two locators in the two-dimensional code.

In a possible implementation, that the electronic device decodes the to-be-decoded two-dimensional code based on the coding mode to obtain the first information includes: The electronic device decodes, based on the coding mode, the binary value corresponding to the storage location occupied by each of the plurality of code elements in the code region of the to-be-decoded two-dimensional code to obtain the first information. Different coding modes correspond to different quantities of coded bits. In this way, the electronic device can accurately decode, based on a coding mode, a binary value with a corresponding quantity of bits to obtain the first information.

In a possible implementation, that the electronic device obtains mode indication information from the to-be-decoded two-dimensional code includes: The electronic device obtains, from the to-be-encoded two-dimensional code, one piece of mode indication information and one or more pieces of sub-mode indication information included in the coding model information.

That the electronic device determines a coding mode for the to-be-decoded two-dimensional code from the mode indication information includes: The electronic device determines the coding mode for the to-be-decoded two-dimensional code from the mode indication information, and determines one or more coding sub-modes for the to-be-decoded two-dimensional code from the one or more pieces of sub-mode indication information.

That the electronic device decodes, based on the coding mode, the binary value corresponding to the storage location occupied by each of the plurality of code elements in the code region of the to-be-decoded two-dimensional code to obtain the first information includes: The electronic device decodes, based on the one or more coding sub-modes, the binary value corresponding to the storage location occupied by each of the plurality of code elements in the code region of the to-be-decoded two-dimensional code to obtain the first information.

The first information may be encoded into the to-be-decoded two-dimensional code by using a plurality of coding sub-modes in a coding mode. In this way, the electronic device can accurately decode, through stepwise decoding, the to-be-decoded two-dimensional code to obtain the first information.

In a possible implementation, the one or more coding sub-modes include a first coding sub-mode and a second coding sub-mode, the code region includes a first code region and a second code region, and that the electronic device decodes, based on the one or more coding sub-modes, the binary value corresponding to the storage location occupied by each of the plurality of code elements in the code region of the to-be-decoded two-dimensional code to obtain the first information includes: The electronic device decodes, based on the first coding sub-mode, a binary value corresponding to a storage location occupied by each of a plurality of code elements in the first code region, and decodes, based on the second coding sub-mode, a binary value corresponding to a storage location occupied by each of a plurality of code elements in the second code region, to obtain the first information. In this way, the electronic device can accurately decode, through stepwise decoding, the to-be-decoded two-dimensional code to obtain the first information.

In a possible implementation, the mode indication information and the one or more pieces of sub-mode indication information are binary characters with fixed quantities of bits.

In a possible implementation, that the electronic device determines a coding mode for the to-be-decoded two-dimensional code from the mode indication information, where the electronic device stores one or more mapping relationship tables, and the mapping relationship table includes the mode indication information and a coding mode corresponding to the mode indication information includes:

The electronic device queries the mapping relationship table for the coding mode corresponding to the mode indication information and a quantity of coded bits in the coding mode.

In a possible implementation, that the electronic device determines a coding mode for the to-be-decoded two-dimensional code from the mode indication information, where the electronic device stores one or more mapping relationship tables, and the mapping relationship table includes the mode indication information and a coding mode corresponding to the mode indication information specifically includes: The electronic device queries the mapping relationship table for the coding mode corresponding to the mode indication information and a coding sub-mode, corresponding to each piece of sub-mode indication information, of the one or more coding sub-modes.

In a possible implementation, the to-be-decoded two-dimensional code includes one piece of mode indication information and a plurality of pieces of sub-mode indication information, the first information includes two or more of a numeric character, an uppercase letter character, a lowercase letter character, a special character, and an escape character, and the numeric character, the uppercase letter character, the lowercase letter character, the special character, and the escape character correspond to different target coding modes with smallest quantities of coded bits.

In a possible implementation, each of the one or more coding sub-modes corresponds to one coding index table; the coding index table includes a first coding index table, a second coding index table, a third coding index table, a fourth coding index table, a fifth coding index table, a sixth coding index table, a seventh coding index table, and an eighth coding index table; the first coding index table includes the numeric character; the second coding index table includes the numeric character and the uppercase letter character; the third coding index table includes the numeric character and the lowercase letter character; the fourth coding index table includes the uppercase letter character and the special character; the fifth coding index table includes the lowercase letter character and the special character; the sixth coding index table includes the numeric character, the uppercase letter character, and the special character; the seventh coding index table includes the numeric character, the lowercase letter character, and the special character; and the eighth coding index table includes the numeric character, the uppercase letter character, the lowercase letter character, and the special character.

In a possible implementation, the target version of the to-be-decoded two-dimensional code includes a first version, a second version, a third version, a fourth version, a fifth version, and a sixth version, and the to-be-decoded two-dimensional code has different data capacities based on different target versions of the to-be-decoded two-dimensional code.

According to a third aspect, this application provides an electronic device, including one or more processors and one or more memories. The one or more memories are coupled to the one or more processors. The one or more memories are configured to store computer program code, and the computer program code includes computer instructions. When the computer instructions run on the processor, the electronic device is enabled to perform the following operations: obtaining to-be-encoded text, where the to-be-encoded text includes N characters, and N is a positive integer; determining a target coding mode for each of the N characters from X optional coding modes; grouping the N characters into M character fields based on the target coding mode for each character, and determining a target coding mode for each of the M character fields, where M is less than or equal to N; encoding the M character fields based on the target coding mode for each character field to obtain a first binary character string; and generating, based on the first binary character string, a two-dimensional code of a version corresponding to a length of the first binary character string.

In the two-dimensional code encoding method provided in this embodiment of this application, the electronic device can encode the to-be-encoded text into a shorter binary character string. When a character length of the to-be-encoded text is excessively large, a binary character string obtained by using an encoding method in the conventional technology exceeds a data capacity of a two-dimensional code in the conventional technology, leading to a failure of generating a two-dimensional code. However, in the two-dimensional code encoding method in this embodiment of this application, the to-be-encoded text with a large character length can be encoded to generate a two-dimensional code.

In a possible implementation, the processor is further configured to perform the following operations: determining one or more candidate coding modes for a first character of the N characters from the X optional coding modes; and selecting, from the one or more candidate coding modes, a candidate coding mode with a smallest quantity of coded bits as a target coding mode for the first character.

In this way, the electronic device can encode each character into a binary character string with a smaller quantity of bits. Therefore, the electronic device can encode the to-be-encoded text into a shorter binary character string.

In a possible implementation, the processor is further configured to perform the following operations: grouping, into one character field, consecutive adjacent characters corresponding to a same target coding mode among the N characters, to obtain the M character fields; and determining the target coding mode for each of the M character fields based on a target coding mode for a character in each character field.

In a possible implementation, the M character fields include a first character field, the first character field includes the first character and a second character, the first character and the second character correspond to a same target coding mode, and a target coding mode for the first character field is the same as that for the first character and the second character.

In this way, the electronic device groups the N characters into character fields for encoding, so that a quantity of binary bits occupied by a mode indicator can be reduced, and a shorter binary character string can be obtained.

In a possible implementation, the processor is further configured to perform the following operations: grouping, into one character field, consecutive adjacent characters that correspond to a same target coding mode and whose quantity is greater than a preset quantity among the N characters, to obtain the M character fields; and determining the target coding mode for each of the M character fields based on a target coding mode for a character in each character field.

In this way, the electronic device can group the N characters into fewer character fields, and only one mode indicator needs to be used for each character field. Compared with a case in which one character is one character field, a binary character string obtained by the electronic device includes fewer mode indicators. In this way, a quantity of bits of mode indicators can be reduced. Therefore, the electronic device can obtain a shorter binary character string.

In a possible implementation, the M character fields include a second character field, and a quantity of characters in the second character field is greater than or equal to the preset quantity.

In a possible implementation, the processor is further configured to perform the following operations: starting counting from a $1^{st}$ character of the N characters; when a $(u-1)^{th}$ character is counted, determining that a quantity of characters is greater than or equal to a preset quantity, and when the $(u-1)^{th}$ character and a $u^{th}$ character correspond to different target coding modes, grouping the $1^{st}$ character to the $(u-1)^{th}$ character of the N characters into one character field, to obtain the M character fields; and determining the target coding mode for each of the M character fields based on a target coding mode for a character in each of the M character fields.

In this way, the electronic device can group the N characters into fewer character fields, and only one mode indicator needs to be used for each character field. Compared with a case in which one character is one character field, a binary character string obtained by the electronic device includes fewer mode indicators. In addition, a quantity of coded bits in a target coding mode for a character field can be reduced. In this way, the electronic device can obtain a shorter binary character string.

In a possible implementation, the processor is further configured to perform the following operations: determining that the target coding mode for the first character and the second character in the first character field is a first target coding mode; and using the first target coding mode as the target coding mode for the first character field.

In a possible implementation, the processor is further configured to perform the following operations: determining that a target coding mode for the first character in the first character field is a first target coding mode, and a target coding mode for the second character in the first character field is a second target coding mode, where a quantity of coded bits in the first target coding mode is greater than that in the second target coding mode, a coding index table corresponding to the first target coding mode includes the second character, and the X optional coding modes include the first target coding mode and the second target coding mode; and using the first target coding mode as the target coding mode for the first character field.

In a possible implementation, the processor is further configured to perform the following operations: determining that a target coding mode for the first character in the first character field is a first target coding mode, and a target coding mode for the second character in the first character field is a second target coding mode, where the first target coding mode is different from the second target coding mode, a coding index table corresponding to the first target coding mode does not include the first character, a coding index table corresponding to the second target coding mode does not include the second character, a quantity of coded bits corresponding to a third target coding mode is greater than that corresponding to the first target coding mode and the second target coding mode, and the X optional coding modes include the first target coding mode, the second target coding mode, and the third target coding mode; and using the third target coding mode as the target coding mode for the first character field.

In a possible implementation, the first binary character string includes a second binary character string, the second binary character string is obtained by encoding the first character field, and the second binary character field includes a mode indicator for the target coding mode for the first character field, a character length indicator for the first character field, and a binary character string obtained by encoding a character in a first character string based on a target coding mode for the first character string.

In a possible implementation, the N characters include one or more of a numeric character, an uppercase letter character, a lowercase letter character, a special character, and an escape character, and the numeric character, the uppercase letter character, the lowercase letter character, the special character, and the escape character correspond to different target coding modes with smallest quantities of coded bits.

In a possible implementation, each of the X optional coding modes corresponds to one coding index table; the coding index table includes a first coding index table, a second coding index table, a third coding index table, a fourth coding index table, a fifth coding index table, a sixth coding index table, a seventh coding index table, and an eighth coding index table; the first coding index table includes the numeric character; the second coding index table includes the numeric character and the uppercase letter character; the third coding index table includes the numeric character and the lowercase letter character; the fourth coding index table includes the uppercase letter character and the special character; the fifth coding index table includes the lowercase letter character and the special character; the sixth coding index table includes the numeric character, the uppercase letter character, and the special character; the seventh coding index table includes the numeric character, the lowercase letter character, and the special character; and the eighth coding index table includes the numeric character, the uppercase letter character, the lowercase letter character, and the special character.

In a possible implementation, the two-dimensional code includes a two-dimensional code of a first version, a two-dimensional code of a second version, a two-dimensional code of a third version, a two-dimensional code of a fourth version, a two-dimensional code of a fifth version, and a two-dimensional code of a sixth version, and the two-dimensional code of the first version, the two-dimensional code of the second version, the two-dimensional code of the third version, the two-dimensional code of the fourth version, the two-dimensional code of the fifth version, and the two-dimensional code of the sixth version have different data capacities.

In a possible implementation, the two-dimensional code is a circular two-dimensional code, the circular two-dimensional code includes a code region including a plurality of concentric circles, and a ring of each of the plurality of concentric circles includes a plurality of code elements.

According to a fourth aspect, this application provides an electronic device, including one or more processors and one or more memories. The one or more memories are coupled to the one or more processors. The one or more memories are configured to store computer program code, and the computer program code includes computer instructions. When the computer instructions run on the processor, the electronic device is enabled to perform the following operations: obtaining a to-be-decoded two-dimensional code, where the to-be-decoded two-dimensional code indicates first information; obtaining mode indication information from the to-be-decoded two-dimensional code; determining a coding mode for the to-be-decoded two-dimensional code from the mode indication information, where the electronic device stores one or more mapping relationship tables, and the mapping relationship table includes the mode indication information and a coding mode corresponding to the mode indication information; and decoding the to-be-decoded two-dimensional code based on the coding mode to obtain the first information.

In this way, in the two-dimensional code decoding method provided in this application, the electronic device can decode two-dimensional codes corresponding to different coding modes.

In a possible implementation, the electronic device is further configured to perform the following operation: obtaining the mode indication information from a code element that stores the mode indication information in the code region. In this way, the electronic device can obtain the mode indication information.

In a possible implementation, the electronic device is further configured to perform the following operations: obtaining version information of the to-be-decoded two-dimensional code, and determining a target version of the to-be-decoded two-dimensional code based on the version information, where the target version indicates coordinate information of each storage location in the code region of the to-be-decoded two-dimensional code; and determining, based on the coordinate information of each storage location, a binary value corresponding to a storage location occupied by each of a plurality of code elements in the code region of the to-be-decoded two-dimensional code. In this way, the electronic device can accurately determine a binary value corresponding to each code element in the code region.

Optionally, binary data may be 0 or 1.

In a possible implementation, the electronic device may determine the version information of the to-be-decoded two-dimensional code based on a distance between any two locators in the to-be-decoded two-dimensional code. Different version information corresponds to different distances between any two locators in the two-dimensional code.

In a possible implementation, the electronic device is further configured to perform the following operation: decoding, based on the coding mode, the binary value corresponding to the storage location occupied by each of the plurality of code elements in the code region of the to-be-decoded two-dimensional code to obtain the first information. Different coding modes correspond to different quantities of coded bits. In this way, the electronic device can accurately decode, based on a coding mode, a binary value with a corresponding quantity of bits to obtain the first information.

In a possible implementation, the electronic device is further configured to perform the following operations: obtaining, from the to-be-encoded two-dimensional code, one piece of mode indication information and one or more pieces of sub-mode indication information included in the coding model information; determining the coding mode for the to-be-decoded two-dimensional code from the mode indication information, and determining one or more coding sub-modes for the to-be-decoded two-dimensional code from the one or more pieces of sub-mode indication information; and decoding, based on the one or more coding sub-modes, the binary value corresponding to the storage location occupied by each of the plurality of code elements in the code region of the to-be-decoded two-dimensional code to obtain the first information.

The first information may be encoded into the to-be-decoded two-dimensional code by using a plurality of coding sub-modes in a coding mode. In this way, the electronic device can accurately decode, through stepwise decoding, the to-be-decoded two-dimensional code to obtain the first information.

In a possible implementation, the one or more coding sub-modes include a first coding sub-mode and a second coding sub-mode, the code region includes a first code region and a second code region, and the electronic device is further configured to perform the following operation: decoding, based on the first coding sub-mode, a binary value corresponding to a storage location occupied by each of a plurality of code elements in the first code region, and decoding, based on the second coding sub-mode, a binary value corresponding to a storage location occupied by each of a plurality of code elements in the second code region, to obtain the first information. In this way, the electronic device can accurately decode, through stepwise decoding, the to-be-decoded two-dimensional code to obtain the first information.

In a possible implementation, the mode indication information and the one or more pieces of sub-mode indication information are binary characters with fixed quantities of bits.

In a possible implementation, the electronic device is further configured to perform the following operation: querying the mapping relationship table for the coding mode corresponding to the mode indication information and a quantity of coded bits in the coding mode.

In a possible implementation, the electronic device is further configured to perform the following operation: querying the mapping relationship table for the coding mode corresponding to the mode indication information and a coding sub-mode, corresponding to each piece of sub-mode indication information, of the one or more coding sub-modes.

In a possible implementation, the to-be-decoded two-dimensional code includes one piece of mode indication information and a plurality of pieces of sub-mode indication information, the first information includes two or more of a numeric character, an uppercase letter character, a lowercase letter character, a special character, and an escape character, and the numeric character, the uppercase letter character, the lowercase letter character, the special character, and the escape character correspond to different target coding modes with smallest quantities of coded bits.

In a possible implementation, each of the one or more coding sub-modes corresponds to one coding index table; the coding index table includes a first coding index table, a second coding index table, a third coding index table, a fourth coding index table, a fifth coding index table, a sixth coding index table, a seventh coding index table, and an eighth coding index table; the first coding index table includes the numeric character; the second coding index table includes the numeric character and the uppercase letter character; the third coding index table includes the numeric character and the lowercase letter character; the fourth coding index table includes the uppercase letter character and the special character; the fifth coding index table includes the lowercase letter character and the special character; the sixth coding index table includes the numeric character, the uppercase letter character, and the special character; the seventh coding index table includes the numeric character, the lowercase letter character, and the special character; and the eighth coding index table includes the numeric character, the uppercase letter character, the lowercase letter character, and the special character.

In a possible implementation, the target version of the to-be-decoded two-dimensional code includes a first version, a second version, a third version, a fourth version, a fifth version, and a sixth version, and the to-be-decoded two-dimensional code has different data capacities based on different target versions of the to-be-decoded two-dimensional code.

According to a fifth aspect, this application provides an electronic device, including one or more processors and one or more memories. The one or more memories are coupled to the one or more processors. The one or more memories are configured to store computer program code, and the computer program code includes computer instructions. When the computer instructions run on the processor, the electronic device is enabled to perform the two-dimensional code encoding method according to any one of the possible implementations of the first aspect and the two-dimensional code decoding method according to any one of the possible implementations of the second aspect.

According to a sixth aspect, an embodiment of this application provides a computer storage medium, including computer instructions. When the computer instructions run on an electronic device, the electronic device is enabled to perform the two-dimensional code encoding method according to any one of the possible implementations of the foregoing aspects and the two-dimensional code decoding method according to any one of the possible implementations of the second aspect.

According to a seventh aspect, an embodiment of this application provides a computer program product. When the computer program product runs on a computer, the computer is enabled to perform the two-dimensional code encoding method according to any one of the possible implementations of the foregoing aspects and the two-dimensional code decoding method according to any one of the possible implementations of the second aspect.

BRIEF DESCRIPTION OF THE DRAWINGS

FIG. 4 is a schematic flowchart of a two-dimensional code encoding method according to an embodiment of this application;

FIG. 5 is a schematic diagram of dividing a character string into a plurality of character fields according to an embodiment of this application;

FIG. 6D is a schematic diagram of a format of an encoding result for another character string according to an embodiment of this application;

FIG. 7 is a schematic diagram of steps of generating a two-dimensional code based on an encoding result in a two-dimensional code encoding method according to an embodiment of this application;

DETAILED DESCRIPTION OF ILLUSTRATIVE EMBODIMENTS

Figure 1:
FIG. 1 is a schematic diagram of a QR code according to an embodiment of this application.

Terms used in the following embodiments of this application are merely intended to describe specific embodiments, but not to limit this application. The terms "one", "a", "the", "the foregoing", "this", and "the one" of singular forms used in this specification and the appended claims of this application are also intended to include plural forms, unless otherwise specified in the context clearly. It should be further understood that the term "and/or" used in this application indicates and includes any or all possible combinations of one or more listed items.

The terms "first" and "second" used below are merely intended for a purpose of description, and shall not be construed as an indication or an implication of relative importance or an implicit indication of a quantity of indicated technical features. Therefore, a feature limited by "first" or "second" may explicitly or implicitly include one or more features. In descriptions of embodiments of this application, "a plurality of" means two or more than two, unless otherwise specified. The terms "middle", "left", "right", "upper", "lower", and the like indicate an orientation or a location relationship based on an orientation or a location relationship shown in accompanying drawings, and are merely intended to facilitate description of this application and simplify description, but not to indicate or imply that an indicated apparatus or element needs to have a specific orientation or be constructed or operated in a specific orientation. Therefore, the terms cannot be construed as a limitation on this application.

Embodiments of this application relate to application of a two-dimensional code encoding method. The method may be applied to an electronic device 100. In the method, first, the electronic device wo may obtain to-be-encoded text, where the to-be-encoded text may include one or more of a digit, an uppercase letter, a lowercase letter, a Chinese character, a Japanese character, and the like. Then the electronic device boo may divide the to-be-encoded text into a plurality of fields. Then the electronic device 100 selects a coding mode with a smallest quantity of bits to encode each of the plurality of fields to obtain a binary character string, where the electronic device stores N coding tables, and each coding table corresponds to one coding mode. Finally, the electronic device 100 may generate a two-dimensional code based on the binary character string.

The following first describes some concepts included in a two-dimensional code encoding method provided in this application.

1. Coding Mode

In embodiments of this application, a plurality of coding modes may be available on an electronic device, and each coding mode is used to convert to-be-encoded text into a binary character. However, different conversion methods are used in different coding modes. When a coding mode is selected for encoding, the electronic device 100 converts, based on a coding index table corresponding to the coding mode, a character in the to-be-encoded text into an index value corresponding to the character, and then converts the index value into a binary character based on the coding mode.

Table 1 lists some coding modes and mode indicators corresponding to the coding modes as examples.

TABLE 1

| Coding mode (mode) | Mode indicator (indicator) |
|---|---|
| Terminator Mode | 0000 |
| Numeric Mode: a numeric coding mode (Only coding for digits 0 to 9 is supported.) | 0001 |
| Alphanumeric Mode: a character coding mode (Coding for digits, uppercase letters A to Z, spaces, and $ % * + − . /: is supported.) | 0010 |
| Structured_Append: a hybrid coding mode | 0011 |
| Byte Mode: a byte coding mode (Coding for characters 0x00 to 0xFF is supported.) | 0100 |
| ECI Mode: used for special character sets | 0111 |
| KANJI Mode: a Japanese coding mode (Coding for characters 0x8140 to 0x9FFC and 0xE040 to 0xEBBF is supported.) | 1000 |
| FNC1_FIRST_POSITION Mode: used to identify a symbol in a specific industry. FC1 in a first position supports the GS1 standard. | 0101 |
| FNC1_SECOND_POSITION Mode (FC1 in a second position supports information formatting based on a specific industry or specific application specifications recognized by AIM.) | 1001 |
| HANZI Mode: a Chinese coding mode | 1101 |

The coding modes and the mode indicators corresponding to the coding modes shown in Table 1 are coding modes and mode indicators provided in a standard protocol for two-dimensional codes. It can be understood that there may be more coding modes with development of the standard protocol for two-dimensional codes. Coding modes in embodiments of this application may not be limited to the coding modes provided in Table 1.

In embodiments of this application, the hybrid coding mode Structured_Append may include a plurality of coding sub-modes, and each coding sub-mode corresponds to one coding index table. The coding sub-modes of the hybrid coding mode Structured_Append may be shown in Table 2. Table 2 shows eight sub-modes of the hybrid coding mode as examples: a pure numeric coding mode, an uppercase hexadecimal coding mode, a lowercase hexadecimal coding mode, a hybrid coding mode for digits and uppercase letters, a hybrid coding mode for digits and lowercase letters, a hybrid coding mode for digits, uppercase letters, and common characters, a hybrid coding mode for digits, lowercase letters, and common characters, and a hybrid coding mode for digits, uppercase letters, lowercase letters, special characters, and escape characters.

TABLE 2

| Coding sub-mode 1 of the hybrid coding mode | Pure numeric coding mode (which may also be referred to as a Base10 mode in embodiments of this application) |
|---|---|
| Coding sub-mode 2 of the hybrid coding mode | Uppercase hexadecimal coding mode (which may also be referred to as a Base16_U mode in embodiments of this application) |
| Coding sub-mode 3 of the hybrid coding mode | Lowercase hexadecimal coding mode (which may also be referred to as a Base16_L mode in embodiments of this application) |
| Coding sub-mode 4 of the hybrid coding mode | Hybrid coding mode for uppercase letters and special characters (which may also be referred to as a Base32_U mode in embodiments of this application) |
| Coding sub-mode 5 of the hybrid coding mode | Hybrid coding mode for lowercase letters and special characters (which may also be referred to as a Base32_L mode in embodiments of this application) |

TABLE 2-continued

| Coding sub-mode 6 of the hybrid coding mode | Hybrid coding mode for digits, uppercase letters, and special characters (which may also be referred to as a Base45_U mode in embodiments of this application) |
|---|---|
| Coding sub-mode 7 of the hybrid coding mode | Hybrid coding mode for digits, lowercase letters, and special characters (which may also be referred to as a Base45_L mode in embodiments of this application) |
| Coding sub-mode 8 of the hybrid coding mode | Hybrid coding mode for digits, uppercase letters, lowercase letters, special characters, and escape characters (which may also be referred to as a Base128 mode in embodiments of this application) |

It can be understood that Table 2 is merely an example, and the coding sub-modes of the hybrid coding mode Structured_Append may not be limited to the eight coding sub-modes shown in Table 2. The coding sub-modes of the hybrid coding mode may further include a Spanish coding mode, a Portuguese coding mode, a Korean coding mode, a hybrid coding mode for different languages, or the like. This is not limited herein.

In embodiments of this application, a digit "0" to a digit "9" may be referred to as numeric characters, an uppercase English letter "A" to an uppercase English letter "Z" may be referred to as uppercase letter characters, and a lowercase English letter "a" to a lowercase English letter "z" may be referred to as lowercase letter characters. Characters other than digits, uppercase English letters, and lowercase English letters on a computer keyboard may be referred to as special characters, for example, a question mark ?, double quotation marks " ", a left parenthesis (, and a right parenthesis). An escape character includes a backslash and another character, for example, "\0", "\a", and the like.

2. Coding Index Table

A coding index table is used to specify an index value (value) corresponding to a character (char). In embodiments of this application, the electronic device 100 may store a coding index table corresponding to the Base10 mode, a coding index table corresponding to the Base16_U mode, a coding index table corresponding to the Base16_L mode, a coding index table corresponding to the Base32_U mode, a coding index table corresponding to the Base32_L mode, a coding index table corresponding to the Base45_U mode, a coding index table corresponding to the Base45_L mode, and a coding index table corresponding to the Base128 mode.

For example, the coding index table corresponding to the Base10 mode may be shown in Table 3.

TABLE 3

| Character (char) | Index value (value) | Character (char) | Index value (value) |
|---|---|---|---|
| 0 | 0 | 5 | 5 |
| 1 | 1 | 6 | 6 |
| 2 | 2 | 7 | 7 |
| 3 | 3 | 8 | 8 |
| 4 | 4 | 9 | 9 |

Table 3 shows a coding index table for pure numeric characters. The coding index table may include a numeric character "0" to a numeric character "9" and index values respectively corresponding to the numeric character "0" to the numeric character "9". For example, when a character in to-be-encoded text is "0", an index value corresponding to the character in the coding index table shown in Table 3 is "0". The index values shown in Table 3 may be decimal values. To be specific, the index value "0" to the index value "9" may be decimal values.

It can be understood that the coding index table corresponding to the Base10 mode may not be limited to the coding index table shown in Table 3. The coding index table corresponding to the Base10 mode may change with a change of a two-dimensional code encoding protocol. A specific form and content of the coding index table corresponding to the Base10 mode are not limited herein.

For example, the coding index table corresponding to the Base16_U mode may be shown in Table 4.

TABLE 4

| Character (char) | Index value (value) | Character (char) | Index value (value) |
|---|---|---|---|
| 0 | 0 | 8 | 8 |
| 1 | 1 | 9 | 9 |
| 2 | 2 | A | 10 |
| 3 | 3 | B | 11 |
| 4 | 4 | C | 12 |
| 5 | 5 | D | 13 |
| 6 | 6 | E | 14 |
| 7 | 7 | F | 15 |

Table 4 shows a hexadecimal coding index table. The coding index table may include index values respectively corresponding to hexadecimal characters (numeric characters "0" to "9", and uppercase letters "A" to "F"). For example, in Table 4, an index value corresponding to the character "0" is "0", and an index value corresponding to the character "A" is "10". The index values shown in Table 4 may be decimal values. To be specific, the index value "0" to the index value "15" in Table 4 may be decimal values.

It can be understood that the coding index table corresponding to the Base16_U mode may not be limited to the coding index table shown in Table 4. The coding index table corresponding to the Base16_U mode may change with a change of a two-dimensional code encoding protocol. A specific form and content of the coding index table corresponding to the Base16_U mode are not limited herein.

For example, the coding index table corresponding to the Base16_L mode may be shown in Table 5.

TABLE 5

| Character (char) | Index value (value) | Character (char) | Index value (value) |
|---|---|---|---|
| 0 | 0 | 8 | 8 |
| 1 | 1 | 9 | 9 |
| 2 | 2 | a | 10 |
| 3 | 3 | b | 11 |
| 4 | 4 | c | 12 |
| 5 | 5 | d | 13 |
| 6 | 6 | e | 14 |
| 7 | 7 | f | 15 |

Table 5 shows a hexadecimal coding index table. The coding index table may include index values respectively corresponding to hexadecimal characters (numeric characters "0" to "9", and a lowercase letter "a" to a lowercase letter "f"). For example, in Table 5, an index value corresponding to the character "0" is "0", and an index value corresponding to the character "a" is "10". The index values shown in Table 5 may be decimal values. To be specific, the index value "0" to the index value "15" in Table 5 may be decimal values.

It can be understood that the coding index table corresponding to the Base16_L mode may not be limited to the coding index table shown in Table 5. The coding index table corresponding to the Base16_L mode may change with a change of a two-dimensional code encoding protocol. A specific form and content of the coding index table corresponding to the Base16_L mode are not limited herein.

For example, the coding index table corresponding to the Base32_U mode may be shown in Table 6.

TABLE 6

| Character (char) | Index value (value) |
|---|---|
| A | 0 |
| B | 1 |
| C | 2 |
| D | 3 |
| E | 4 |
| F | 5 |
| G | 6 |
| H | 7 |
| I | 8 |
| J | 9 |
| K | 10 |
| L | 11 |
| M | 12 |
| N | 13 |
| O | 14 |
| P | 15 |
| Q | 16 |
| R | 17 |
| S | 18 |
| T | 19 |
| U | 20 |
| V | 21 |
| W | 22 |
| X | 23 |
| Y | 24 |
| Z | 25 |
| SP | 26 |
| | 27 |
| | 28 |
| | 29 |
| | 30 |
| | 31 |

Table 6 shows a coding index table for uppercase letters and special characters. The coding index table may include uppercase letters "A" to "Z" and a special character "SP", index values respectively corresponding to the uppercase letters "A" to "Z", and an index value corresponding to the special character "SP". For example, in Table 6, an index value corresponding to the uppercase character "A" may be "0", and the index value corresponding to the special character "SP" may be "26". The index values shown in Table 6 may be decimal values. To be specific, the index values "0" to "31" in Table 6 may be decimal values.

It can be understood that the coding index table corresponding to the Base32_U mode may not be limited to the coding index table shown in Table 6. The coding index table corresponding to the Base32_U mode may change with a change of a two-dimensional code encoding protocol. A specific form and content of the coding index table corresponding to the Base32_U mode are not limited herein.

For example, the coding index table corresponding to the Base32_L mode may be shown in Table 7.

TABLE 7

| Character (char) | Index value (value) |
|---|---|
| a | 0 |
| b | 1 |
| c | 2 |
| d | 3 |
| e | 4 |
| f | 5 |
| g | 6 |
| h | 7 |
| i | 8 |
| j | 9 |
| k | 10 |
| l | 11 |
| m | 12 |
| n | 13 |
| o | 14 |
| p | 15 |
| q | 16 |
| r | 17 |
| s | 18 |
| t | 19 |
| u | 20 |
| v | 21 |
| w | 22 |
| x | 23 |
| y | 24 |
| z | 25 |
| SP | 26 |
|  | 27 |
|  | 28 |
|  | 29 |
|  | 30 |
|  | 31 |

Table 7 shows a coding index table for lowercase letters and special characters. The coding index table may include lowercase letters "a" to "z" and a special character "SP", index values respectively corresponding to the lowercase letters "a" to "z", and an index value corresponding to the special character "SP". For example, in Table 7, an index value corresponding to the lowercase letter "a" may be "0", and the index value corresponding to the special character "SP" may be "26". The index values shown in Table 7 may be decimal values. To be specific, the index values "0" to "31" in Table 7 may be decimal values.

It can be understood that the coding index table corresponding to the Base32_L mode may not be limited to the coding index table shown in Table 7. The coding index table corresponding to the Base32_L mode may change with a change of a two-dimensional code encoding protocol. A specific form and content of the coding index table corresponding to the Base32_L mode are not limited herein.

For example, the coding index table corresponding to the Base45_U mode may be shown in Table 8.

TABLE 8

| Character (char) | Index value (value) |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| A | 10 |

TABLE 8-continued

| Character (char) | Index value (value) |
|---|---|
| B | 11 |
| C | 12 |
| D | 13 |
| E | 14 |
| F | 15 |
| G | 16 |
| H | 17 |
| I | 18 |
| J | 19 |
| K | 20 |
| L | 21 |
| M | 22 |
| N | 23 |
| O | 24 |
| P | 25 |
| Q | 26 |
| R | 27 |
| S | 28 |
| T | 29 |
| U | 30 |
| V | 31 |
| W | 32 |
| X | 33 |
| Y | 34 |
| Z | 35 |
| ? | 36 |
| $ | 37 |
| % | 38 |
| * | 39 |
| + | 40 |
| - | 41 |
| . | 42 |
| / | 43 |
| : | 44 |

Table 8 shows a coding index table for digits, uppercase letters, and common characters. The coding index table may include numeric characters "0" to "9", uppercase letters "A" to "Z", and special characters (for example, "?", "$", and "%"), index values respectively corresponding to the numeric characters "0" to "9", index values respectively corresponding to the uppercase letters "A" to "Z", and index values respectively corresponding to the common characters. For example, in Table 8, an index value corresponding to the numeric character "0" may be "0", an index value corresponding to the uppercase letter "A" may be "10", and an index value corresponding to the special character "?" may be "36". The index values shown in Table 8 may be decimal values. To be specific, the index values "0" to "44" in Table 8 may be decimal values.

It can be understood that the coding index table corresponding to the Base45_U mode may not be limited to the coding index table shown in Table 8. The coding index table corresponding to the Base45_U mode may change with a change of a two-dimensional code encoding protocol. A specific form and content of the coding index table corresponding to the Base45_U mode are not limited herein.

For example, the coding index table corresponding to the Base45_L mode may be shown in Table 9.

TABLE 9

| Character (char) | Index value (value) |
|---|---|
| 0 | 0 |
| 1 | 1 |
| 2 | 2 |
| 3 | 3 |
| 4 | 4 |

TABLE 9-continued

| Character (char) | Index value (value) |
|---|---|
| 5 | 5 |
| 6 | 6 |
| 7 | 7 |
| 8 | 8 |
| 9 | 9 |
| a | 10 |
| b | 11 |
| c | 12 |
| d | 13 |
| e | 14 |
| f | 15 |
| g | 16 |
| h | 17 |
| i | 18 |
| j | 19 |
| k | 20 |
| l | 21 |
| m | 22 |
| n | 23 |
| o | 24 |
| p | 25 |
| q | 26 |
| r | 27 |
| s | 28 |
| t | 29 |
| u | 30 |
| v | 31 |
| w | 32 |
| x | 33 |
| y | 34 |
| z | 35 |
| SP | 36 |
| ! | 37 |
| - | 38 |
| . | 39 |
| / | 40 |
| : | 41 |
| = | 42 |
| ? | 43 |
| T | 44 |

Table 9 shows a coding index table for digits, lowercase letters, and special characters. The coding index table may include numeric characters "0" to "9", lowercase letters "a" to "z", and common characters (for example, "?", "!", and "="), index values respectively corresponding to the numeric characters "0" to "9", index values respectively corresponding to the lowercase letters "a" to "z", and index values respectively corresponding to the common characters. For example, in Table 9, an index value corresponding to the numeric character "0" may be "0", an index value corresponding to the lowercase letter "a" may be "10", and an index value corresponding to the common character "?" may be "43". The index values shown in Table 9 may be decimal values. To be specific, the index values "0" to "44" in Table 9 may be decimal values.

It can be understood that the coding index table corresponding to the Base45_L mode may not be limited to the coding index table shown in Table 9. The coding index table corresponding to the Base45_L mode may change with a change of a two-dimensional code encoding protocol. A specific form and content of the coding index table corresponding to the Base45_L mode are not limited herein.

For example, the coding index table corresponding to the Base128 mode may be shown in Table 10.

TABLE 10

| Character (char) | Index value (value) |
|---|---|
| \o | 0 |
|  | 1 |
|  | 2 |
|  | 3 |
|  | 4 |
|  | 5 |
|  | 6 |
| \a | 7 |
| \b | 8 |
| \t | 9 |
| \n | 10 |
| \v | 11 |
| \f | 12 |
| \r | 13 |
|  | 14 |
|  | 15 |
|  | 16 |
|  | 17 |
|  | 18 |
|  | 19 |
|  | 20 |
|  | 21 |
|  | 22 |
|  | 23 |
|  | 24 |
|  | 25 |
|  | 26 |
|  | 27 |
|  | 28 |
|  | 29 |
|  | 30 |
|  | 31 |
| SP | 32 |
| ! | 33 |
| " | 34 |
| # | 35 |
| $ | 36 |
| % | 37 |
| & | 38 |
|  | 39 |
|  | 40 |
| ) | 41 |
| * | 42 |
| + | 43 |
| , | 44 |
| - | 45 |
| . | 46 |
| / | 47 |
| 0 | 48 |
| 1 | 49 |
| 2 | 50 |
| 3 | 51 |
| 4 | 52 |
| 5 | 53 |
| 6 | 54 |
| 7 | 55 |
| 8 | 56 |
| 9 | 57 |
| : | 58 |
| ; | 59 |
| < | 60 |
| = | 61 |
|  | 62 |
| ? | 63 |
| @ | 64 |
| A | 65 |
| B | 66 |
| C | 67 |
| D | 68 |
| E | 69 |
| F | 70 |
| G | 71 |
| H | 72 |
| I | 73 |
| J | 74 |
| K | 75 |

TABLE 10-continued

| Character (char) | Index value (value) |
|---|---|
| L | 76 |
| M | 77 |
| N | 78 |
| O | 79 |
| P | 80 |
| Q | 81 |
| R | 82 |
| S | 83 |
| T | 84 |
| U | 85 |
| V | 86 |
| W | 87 |
| X | 88 |
| Y | 89 |
| Z | 90 |
| [ | 91 |
| \ | 92 |
| ] | 93 |
| ^ | 94 |
| _ | 95 |
| ` | 96 |
| a | 97 |
| b | 98 |
| c | 99 |
| d | 100 |
| e | 101 |
| f | 102 |
| g | 103 |
| h | 104 |
| i | 105 |
| j | 106 |
| k | 107 |
| l | 108 |
| m | 109 |
| n | 110 |
| o | 111 |
| p | 112 |
| q | 113 |
| r | 114 |
| s | 115 |
| t | 116 |
| u | 117 |
| v | 118 |
| w | 119 |
| x | 120 |
| y | 121 |
| z | 122 |
| { | 123 |
| \| | 124 |
| } | 125 |
| ~ | 126 |
|   | 127 |

Table 10 shows a coding index table for digits, lowercase letters, uppercase letters, common characters, and escape characters. The coding index table may include numeric characters "0" to "9", lowercase letters "a" to "z", uppercase letters "A" to "Z", common characters (for example, "?", "!", and "="), escape characters, index values respectively corresponding to the numeric characters "0" to "9", index values respectively corresponding to the lowercase letters "a" to "z", index values respectively corresponding to the uppercase letters "A" to "Z", and index values respectively corresponding to the common characters and the escape characters. For example, in Table 10, an index value corresponding to the numeric character "0" may be "16", an index value corresponding to the lowercase letter "a" may be "65", and an index value corresponding to the common character "?" may be "31". The index values shown in Table 10 may be decimal values. To be specific, the index values "0" to "127" in Table 10 may be decimal values.

It can be understood that the coding index table corresponding to the Base128 mode may not be limited to the coding index table shown in Table 10. The coding index table corresponding to the Base128 mode may change with a change of a two-dimensional code encoding protocol. A specific form and content of the coding index table corresponding to the Base128 mode are not limited herein.

It can be understood that coding index tables stored on the electronic device 100 in embodiments of this application may not be limited to the coding index tables shown in Table 3 to Table 10. The electronic device 100 may store more coding index tables. This is not limited herein.

Coded binary bits and mode indicators respectively corresponding to the coding sub-modes (for example, the Base10 mode, the Base16_U mode, the Base16_L mode, the Base32_U mode, the Base32_L mode, the Base45_U mode, the Base45_L mode, and the Base128 mode) of the hybrid coding mode Structured_Append in embodiments of this application may be shown in Table 11.

TABLE 11

| Coding sub-mode (sub-mode) | Bit (binary bits) | Mode indicator (indicator) |
|---|---|---|
| Base10 | 3 | 000 |
| Base16_U | 4 | 001 |
| Base16_L | 4 | 010 |
| Base32_U | 5 | 011 |
| Base32_L | 5 | 100 |
| Base45_U | 6 | 101 |
| Base45_L | 6 | 110 |
| Base128 | 7 | 111 |

Table 11 shows an example of coded binary bits and mode indicators respectively corresponding to the Base10 mode, the Base16_U mode, the Base16_L mode, the Base32_U mode, the Base32_L mode, the Base45_U mode, the Base45_L mode, the Base128 mode, and the like. It can be understood that the coding sub-modes shown in Table 11 and the binary bits and the mode indicators that correspond to the coding sub-modes are merely examples for description. A quantity of coding sub-modes and binary bits and a mode indicator that correspond to each coding sub-mode are not limited in embodiments of this application.

It can be understood that there may be more coding index tables in embodiments of this application, in addition to the coding index tables shown in Table 3 to Table 10.

The electronic device 100 may select any one of the foregoing coding modes to encode to-be-encoded text into a binary character string, and then the electronic device 100 may generate, based on the binary character string, a two-dimensional code corresponding to a version corresponding to a quantity of bits of the binary character string. Two-dimensional codes in embodiments of this application may include two-dimensional codes of different types and two-dimensional codes of a same type but different versions, for example, a QR (Quick Response, quick response) code shown in FIG. 1, two-dimensional codes shown in a diagram (a), a diagram (b), and a diagram (c) in FIG. 2, and circular two-dimensional codes shown in FIG. 3A to FIG. 3F. It can be understood that two-dimensional codes of different types or two-dimensional codes of a same type but different versions usually have different data storage capacities. A larger data storage capacity of a two-dimensional code indicates a longer binary character string that can be stored in the two-dimensional code.

Figure 2:
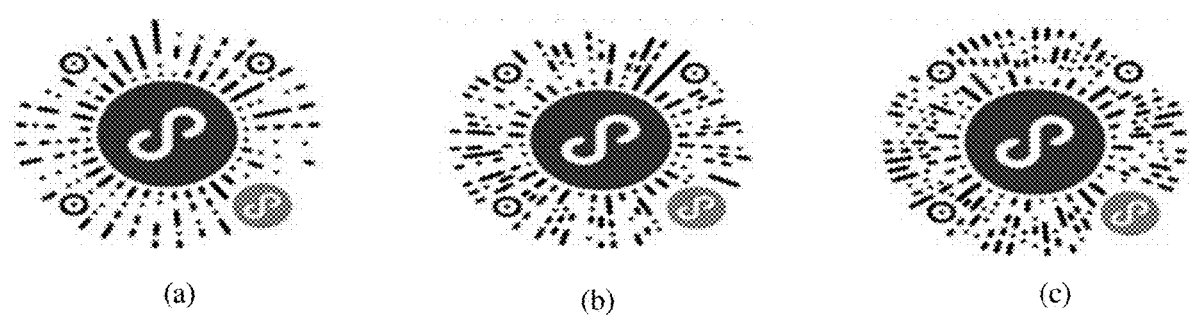
FIG. 2 is a schematic diagram of a group of two-dimensional codes according to an embodiment of this application.

Mini programs shown in the diagram (a), the diagram (b), and the diagram (c) in FIG. 2 are two-dimensional codes of a same type but different versions, with different data storage capacities.

Figure 3A:
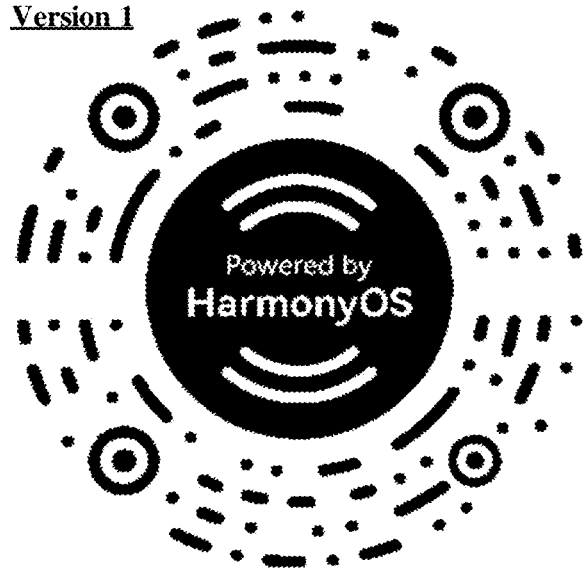
FIG. 3A to FIG. 3F are schematic diagrams of a group of two-dimensional codes according to an embodiment of this application.
Figure 3B:
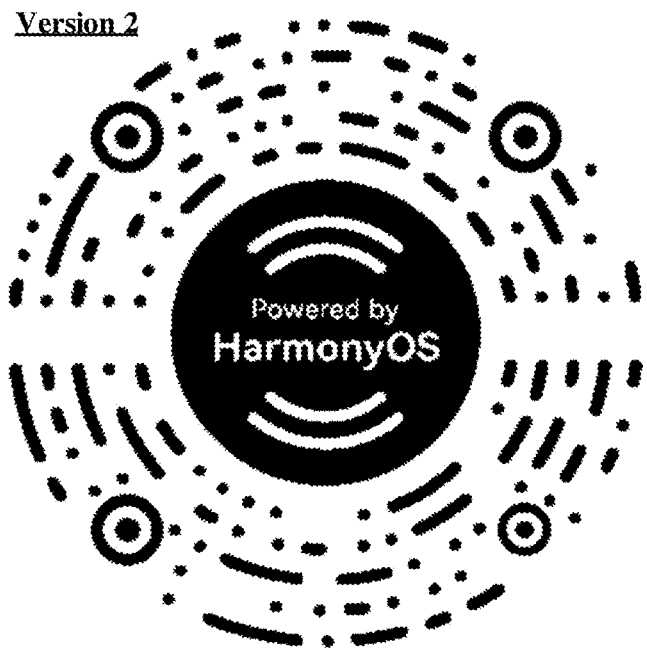
Figure 3C:
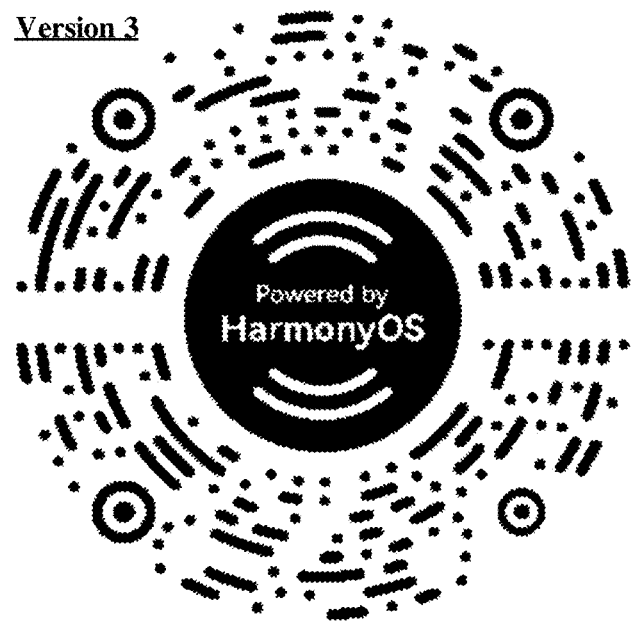
Figure 3D:
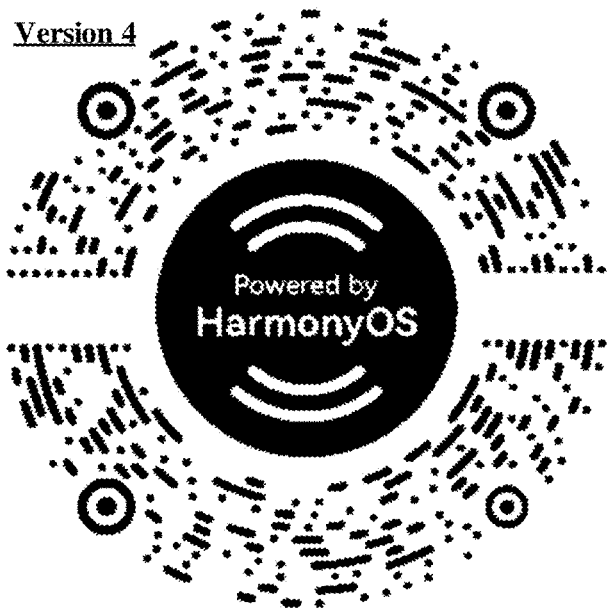
Figure 3E:
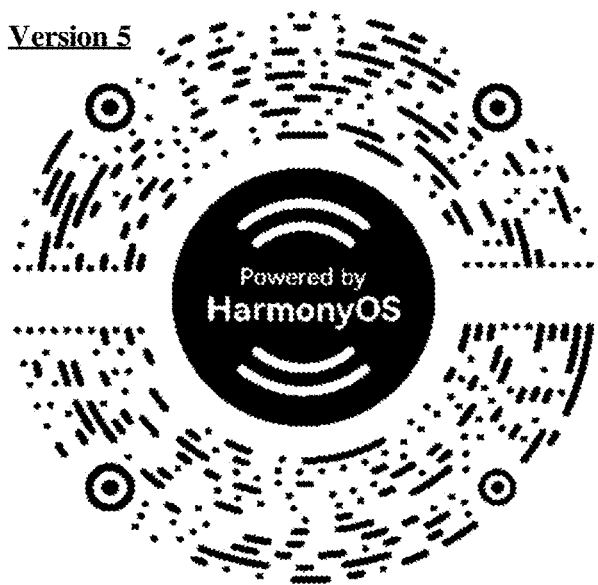
Figure 3F:
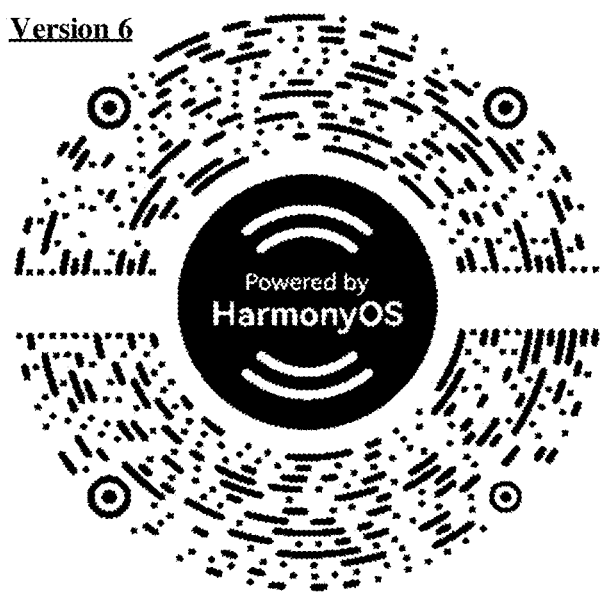

The circular two-dimensional codes shown in FIG. 3A to FIG. 3F belong to a same type but different versions. FIG. 3A shows a circular two-dimensional code of a version 1. FIG. 3B shows a circular two-dimensional code of a version 2. FIG. 3C shows a circular two-dimensional code of a version 3. FIG. 3D shows a circular two-dimensional code of a version 4. FIG. 3E shows a circular two-dimensional code of a version 5. FIG. 3F shows a circular two-dimensional code of a version 6. The circular two-dimensional codes shown in FIG. 3A to FIG. 3F may be referred to as HarmonyOS two-dimensional codes in embodiments of this application. It can be understood that names of the two-dimensional codes shown in FIG. 3A to FIG. 3F are not limited in embodiments of this application.

It can be understood that the two-dimensional codes shown in FIG. 1, FIG. 2, and FIG. 3A to FIG. 3F are merely examples for description. There may be more types of two-dimensional codes and more versions of two-dimensional codes of a specific type in embodiments of this application, in addition to the two-dimensional codes shown in FIG. 1, FIG. 2, and FIG. 3A to FIG. 3F. The two-dimensional codes shown in FIG. 3A to FIG. 3F are used below as examples for description.

For example, data capacities of the two-dimensional codes of different versions in FIG. 3A to FIG. 3F may be shown in Table 12.

TABLE 12

| Version | Binary bits (bits) | Quantity of effective bytes (bytes) |
| --- | --- | --- |
| Version 1 | 249 | 19 |
| Version 2 | 408 | 34 |
| Version 3 | 624 | 55 |
| Version 4 | 872 | 80 |
| Version 5 | 1152 | 108 |
| Version 6 | 1464 | 136 |

As shown in Table 12, a data capacity of the two-dimensional code of the version 1 shown in FIG. 3A is 249 bits, and 19 effective bytes may be stored. A data capacity of the two-dimensional code of the version 2 shown in FIG. 3B is 408 bits, and 34 effective bytes may be stored. A data capacity of the two-dimensional code of the version 3 shown in FIG. 3C is 624 bits, and 55 effective bytes may be stored. A data capacity of the two-dimensional code of the version 4 shown in FIG. 3D is 872 bits, and 80 effective bytes may be stored. A data capacity of the two-dimensional code of the version 5 shown in FIG. 3E is 1152 bits, and 108 effective bytes may be stored. A data capacity of the two-dimensional code of the version 6 shown in FIG. 3F is 1464 bits, and 136 effective bytes may be stored.

Based on the foregoing descriptions of basic concepts included in embodiments of this application, the following describes a two-dimensional code encoding method provided in embodiments of this application. FIG. 4 shows a process of a two-dimensional code encoding method according to an embodiment of this application. The two-dimensional code encoding method may include the following steps.

S101: An electronic device boo obtains to-be-encoded text, where the to-be-encoded text may include N characters.

The electronic device wo may obtain the to-be-encoded text. The N characters of the to-be-encoded text may be one or more of a numeric character, an uppercase English letter, a lowercase English letter, a Chinese character, a Japanese character, a Korean character, a universal character, a special character, an escape character, and the like. Specifically, the to-be-encoded text may be a string of digits, a segment of text (in Chinese, English, Japanese, Korean, or the like), a link, or the like, for example, "12345678", "ABCD", "abcdef", "a two-dimensional code encoding method", or "https://zh.wikipedia.org/wiki/%E4%BD%8D%E5%85%83".

The to-be-encoded text obtained by the electronic device wo may be entered by a user on the electronic device 100, or may be generated by the electronic device 100 based on information entered by the user, or may be obtained by the electronic device boo from another electronic device, or the like. This is not limited herein.

S102: The electronic device 100 determines one or more candidate coding modes for each of the N characters from X optional coding modes, and selects, from the one or more candidate coding modes, a candidate coding mode with a smallest quantity of coded bits as a target coding mode for each character, where X is a positive number.

The electronic device 100 stores X coding modes, and each coding mode corresponds to a quantity of coded bits. For example, Table 11 shows eight coding modes, that is, the Base10 mode, the Base16_U mode, the Base16_L mode, the Base32_U mode, the Base32_L mode, the Base45_U mode, the Base45_L mode, and the Base128 mode, and a quantity of coded bits (namely, a quantity of bits in the table, also referred to as a quantity of binary bits) corresponding to each coding mode.

In this embodiment of this application, X is a positive number, and X may be equal to 8 or 10. This is not limited herein. An example in which X is equal to 8 is used below for description. To be specific, an example in which the eight coding modes shown in Table 11 are configured on the electronic device 100 is used for description.

The coding modes configured on the electronic device 100 may be referred to as optional coding modes. The electronic device 100 may determine, from the X coding modes, one or more candidate coding modes corresponding to each character in the to-be-encoded text. When a coding index table corresponding to a coding mode A includes a character A, the coding mode A may be referred to as a candidate coding mode for the character A. For example, for a character "0", if coding index tables corresponding to coding modes such as the Base10 mode, the Base16_U mode, the Base16_L mode, the Base32_U mode, the Base32_L mode, the Base45_U mode, the Base45_L mode, and the Base128 mode all include the character "0", the Base10 mode, the Base16_U mode, the Base16_L mode, the Base32_U mode, the Base32_L mode, the Base45_U mode, the Base45_L mode, and the Base128 mode may all be referred to as candidate coding modes for the character "0".

It can be learned from Table 11 that a quantity of coded bits in the Base10 mode is 3, a quantity of coded bits in the Base16_U mode is 4, a quantity of coded bits in the Base16_L mode is 4, a quantity of coded bits in the Base32_U mode is 5, a quantity of coded bits in the Base32_L mode is 5, a quantity of coded bits in the Base45_U mode is 6, a quantity of coded bits in the Base45_L mode is 6, and a quantity of coded bits in the Base128 mode is 7. The Base10 mode corresponds to a smallest quantity of coded bits. Therefore, the electronic device 100 may select the Base10 mode from the candidate modes for the character "0" as a target coding mode for the character "0".

Target coding modes for the N characters in the to-be-encoded text may be the same or different. For example, the N characters are 0124FEAabcd (in this case, N is equal to 11). With reference to the foregoing descriptions of determining, by the electronic device 100, the target coding mode for the character "0", the electronic device 100 may determine that a target coding mode for the character "0" is the Base10 mode, a target coding mode for the character "1" is the Base10 mode, a target coding mode for the character "2" is the Base10 mode, a target coding mode for the character "4" is the Base10 mode, a target coding mode for the character "F" is the Base16_U mode, a target coding mode for the character "E" is the Base16_U mode, a target coding mode for the character "A" is the Base16_U mode, a target coding mode for the character "a" is the Base16_L mode, a target coding mode for the character "b" is the Base16_L mode, a target coding mode for the character "c" is the Base16_L mode, and a target coding mode for the character "d" is the Base16_L mode.

It can be understood that N is an integer greater than 1, and a specific value of N is not limited in this embodiment of this application. For example, N may be equal to 1, or N may be equal to 11.

S103: The electronic device 100 groups the N characters into M character fields based on the target coding mode for each of the N characters, and determines target coding modes for the M character fields, where each of the M character fields includes one or more characters.

The electronic device 100 may group the N characters into the M character fields based on the target coding mode for each of the N characters. Each of the M character fields includes one or more characters. M may be less than or equal to N. The electronic device 100 may further determine a target coding mode for a character field based on a target coding mode for each character in the character field.

The electronic device 100 may configure M to be equal to N in a system. The electronic device 100 may alternatively configure M to be less than N.

The electronic device 100 may group the N character into the M character fields in a plurality of manners. An example in which the electronic device 100 segments the N characters "0124FEAabcd" is used to specifically describe how the electronic device groups the N characters into the M character fields based on the target coding mode for each of the N characters, and determines the target coding modes for the M character fields.

Optionally, in a possible implementation, the electronic device 100 may divide the character string "0124FEAabcd" including 11 characters into 11 character fields, that is, each character field includes one character. A target coding mode for each character field is a target coding mode for a character included in the character field. A target coding mode for each character in the character string "0124FEAabcd" and a coding mode for each character field may be shown in Table 13.

TABLE 13

| N characters | Character | Target coding mode for the character | Character field | Target coding mode for the character field |
|---|---|---|---|---|
| 0124FEAabcd | 0 | Base10 mode | 0 | Base10 mode |
| | 1 | Base10 mode | 1 | Base10 mode |
| | 2 | Base10 mode | 2 | Base10 mode |

TABLE 13-continued

| N characters | Character | Target coding mode for the character | Character field | Target coding mode for the character field |
|---|---|---|---|---|
| | 4 | Base10 mode | 4 | Base10 mode |
| | F | Base16_U mode | F | Base16_U mode |
| | E | Base16_U mode | E | Base16_U mode |
| | A | Base16_U mode | A | Base16_U mode |
| | a | Base16_L mode | a | Base16_L mode |
| | b | Base16_L mode | b | Base16_L mode |
| | c | Base16_L mode | c | Base16_L mode |
| | d | Base16_L mode | d | Base16_L mode |

As shown in Table 13, the electronic device 100 may divide the character string "0124FEAabcd" into 11 character fields: a character field "0", a character field "1", a character field "2", a character field "4", a character field "F", a character field "E", a character field "A", a character field "a", a character field "b", a character field "c", and a character field "d". A target coding mode for the character field "0" is the Base10 mode. A target coding mode for the character field "1" is the Base10 mode. A target coding mode for the character field "2" is the Base10 mode. A target coding mode for the character field "4" is the Base10 mode. A target coding mode for the character field "F" is the Base16_U mode. A target coding mode for the character field "E" is the Base16_U mode. A target coding mode for the character field "A" is the Base16_U mode. A target coding mode for the character field "a" is the Base16_L mode. A target coding mode for the character field "b" is the Base16_L mode. A target coding mode for the character field "c" is the Base16_L mode. A target coding mode for the character field "d" is the Base16_L mode.

Optionally, in a possible implementation, the electronic device 100 may group, into one character field, consecutive adjacent characters corresponding to a same target coding mode among the N characters, to finally obtain the M character fields. For example, in the character string "0124FEAabcd", the character "0", the character "1", the character "2", and the character "4" are consecutive adjacent (to be specific, the character "0" is adjacent to the character "1", the character "1" is adjacent to the character "2", and the character "2" is adjacent to the character "4"), and correspond to a same target coding mode. The electronic device 100 may group the character "0", the character "1", the character "2", and the character "4" into one character field "0124". A target coding mode for the character field "0124" is the same as target coding modes for the character "0", the character "1", the character "2", and the character "4", that is, the Base10 mode. A target coding mode for each character in the character string "0124FEAabcd" and a coding mode for each character field may be shown in Table 14.

TABLE 14

| N characters | Character | Target coding mode for the character | Character field | Target coding mode for the character field |
|---|---|---|---|---|
| 0124FEAabcd | 0 | Base10 mode | 0124 | Base10 mode |
| | 1 | Base10 mode | | |
| | 2 | Base10 mode | | |
| | 4 | Base10 mode | | |
| | F | Base16_U mode | FEA | Base16_U mode |
| | E | Base16_U mode | | |
| | A | Base16_U mode | | |
| | a | Base16_L mode | abcd | Base16_L mode |

TABLE 14-continued

| N characters | Character | Target coding mode for the character | Character field | Target coding mode for the character field |
|---|---|---|---|---|
| | b | Base16_L mode | | |
| | c | Base16_L mode | | |
| | d | Base16_L mode | | |

As shown in Table 13, the electronic device 100 may divide the character string "0124FEAabcd" into three character fields: a character field "0124", a character field "FEA", and a character field "abed". The character field "0124" includes four characters, and target coding modes for the four characters are all the Base10 mode. Therefore, a target coding mode for the character field "0124" may also be the Base10 mode. The character field "FEA" includes three characters, and target coding modes for the three characters are all the Base16_U mode. Therefore, a target coding mode for the character field "FEA" may also be the Base16_U mode. The character field "abcd" includes four characters, and target coding modes for the four characters are all the Base16_L mode. Therefore, a target coding mode for the character field "abcd" may also be the Base16_L mode.

Optionally, in a possible implementation, the electronic device 100 may group the N characters into the M character fields, and a quantity of characters in each of the M character fields is greater than or equal to a preset quantity.

Further, the electronic device 100 may sequentially obtain character fields through grouping according to a character arrangement order of the N characters. The electronic device 100 may group, into one character field, consecutive adjacent characters that correspond to a same target coding mode and whose quantity is greater than or equal to the preset quantity among the N characters; or the electronic device 100 may group, into one character field, consecutive adjacent characters that correspond to different target coding modes and whose quantity is greater than or equal to the preset quantity. For example, if the preset quantity is 4, a result of dividing, by the electronic device 100, the character string "0124FEAabcd" into character fields may be shown in Table 15.

TABLE 15

| N characters | Character | Target coding mode for the character | Character field | Target coding mode for the character field |
|---|---|---|---|---|
| 0124FEAabcd | 0 | Base10 mode | 0124 | Base10 mode |
| | 1 | Base10 mode | | |
| | 2 | Base10 mode | | |
| | 4 | Base10 mode | | |
| | F | Base16_U mode | FEAabcd | Base128 mode |
| | E | Base16_U mode | | |
| | A | Base16_U mode | | |
| | a | Base16_L mode | | |
| | b | Base16_L mode | | |
| | c | Base16_L mode | | |
| | d | Base16_L mode | | |

As shown in Table 15, the character "0", the character "1", the character "2", and the character "4" in the character string "0124FEAabcd" are consecutive adjacent and correspond to a same target coding mode. The electronic device 100 may group the character "0", the character "1", the character "2", and the character "4" into one character field "0124". The character "F", the character "E", and the character "A" in the character string "0124FEAabcd" are consecutive adjacent and correspond to different coding modes, but a quantity of the character "F", the character "E", and the character "A" is 3 and does not meet the preset quantity. Therefore, the electronic device 100 may group the character "a", the character "b", the character "c", and the character "d" after the character "A" together with the character "F", the character "E", and the character "A" into one character field "FEAabcd". Target coding modes for the character "F", the character "E", and the character "A" are the Base16_U mode, and target coding modes for the character "a", the character "b", the character "c", and the character "d" are the Base16_L mode. A target coding mode for the character field "FEAabcd" may be the Base128 mode. In the Base128 mode, both uppercase English letters and lowercase English letters can be encoded.

Optionally, the electronic device 100 may divide the character string "0124FEAabcd" into a character field "0124", a character field "FEAa", and a character field "bcd". A target coding mode for the character field "0124" is the Base10 mode. A target coding mode for the character field "FEAa" is the Base128 mode. Optionally, in a possible implementation, the electronic device starts counting from a $1^{st}$ character of the N characters. When a quantity of characters is greater than or equal to the preset quantity and a target coding mode for a $u^{th}$ character is different from that for a $(u-1)^{th}$ character, the electronic device 100 groups the $1^{st}$ character to the $(u-1)^{th}$ character into one character field. Then the electronic device 100 re-starts counting from the $u^{th}$ character. When a quantity of characters is greater than or equal to the preset quantity and a target coding mode for a with character is different from that for a $(v-1)^{th}$ character, the electronic device 100 groups the $u^{th}$ character to the $(v-1)^{th}$ character into one character field. The electronic device wo sequentially groups the N characters into the M character fields.

Further, in a possible implementation, the electronic device may use two pointers to respectively perform counting and identify different target coding modes for a character string. For example, FIG. 5 shows a character string "10ABCD1234aaaa", a pointer i, and a pointer j. The pointer i is used for counting. The pointer j is a position pointer for identifying a new target coding mode. For example, the preset quantity is equal to 4. As shown in FIG. 5, first, the pointer j is at a position j1, that is, at a $1^{st}$ character "1", and the pointer i starts counting from the $1^{st}$ character "1" of the character string "10ABCD1234aaaa". When the pointer j is at a position j2, that is, at a $7^{th}$ character "1", target coding modes for the $7^{th}$ character "1" and a $6^{th}$ character "D" are different, and the electronic device wo groups the first six characters into one character field: a character field "10ABCD". The pointer i re-starts counting from the $7^{th}$ character "1". When j=j3, the electronic device wo finds that a target coding mode for a $13^{th}$ character "a" is different from that for a $12^{th}$ character "4". The electronic device wo groups a total of four characters, that is, the $7^{th}$ character to an $11^{th}$ character, into one character field: a character field "1234". The electronic device boo groups remaining four characters, that is, four consecutive adjacent characters "a", into one character field "aaaa".

It can be understood that, after the electronic device wo groups the N characters into M−1 character fields according to the foregoing steps, if a quantity of remaining characters is less than the preset quantity, the electronic device boo may alternatively group the characters whose quantity is less than the preset quantity into an $M^{th}$ character field. That is, a quantity of characters in a last obtained character field of the M character fields may be less than the preset quantity.

It can be understood that the preset quantity may be configured by the system of the electronic device 100, and an empirical value of the preset quantity is 4. However, a specific value of the preset quantity is not limited in this embodiment of this application. The preset quantity may be 4, 5, or another value.

S104: The electronic device 100 encodes the M character fields based on the target code modes for the M character fields to obtain a binary character string S.

After the electronic device 100 groups the N characters into the M character fields and determines the target coding modes for the M character fields, the electronic device 100 may encode each character field based on a target coding mode for each of the M character fields, to finally obtain the binary character string S.

Figure 6A:
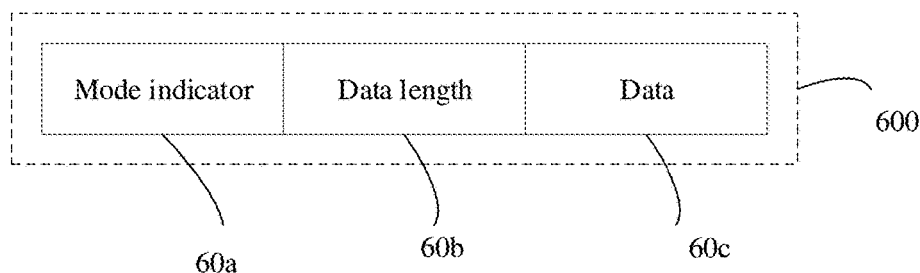
FIG. 6A is a schematic diagram of a format of an encoding result for a character field according to an embodiment of this application.

In a possible implementation, a format of a binary character string obtained by encoding a character field based on a target coding mode for the character field may be shown in FIG. 6A. A binary character string 600 obtained by encoding a character field may include a mode indicator 60a, a data length 60b, and data 60c. The mode indicator 60a is used to identify a coding mode for the binary character string 600. The data length 60b indicates a length of the data 60c in the binary character string 600. The data 60c is binary character data obtained by encoding characters in an original character field based on a target mode. The character field "0124" shown in Table 14 is used below as an example for description. The character field "0124" is encoded based on a target coding mode, namely, the Base10 mode, to obtain a binary character string S1, as shown in Table 16 below.

TABLE 16

| Character field<br>Target coding mode | | | 0124<br>Base10 mode | | | |
|---|---|---|---|---|---|---|
| | Mode | Length | Data | | | |
| | indicator | (4) | 0 | 1 | 2 | 4 |
| Encoding result (namely, the binary character string S1) for the character field | 001 | 100 | 000 | 001 | 010 | 100 |

As shown in Table 16, the target coding mode for the character field "0124" is the Base10 mode. A result obtained by encoding "0124" in the character field "0124" based on the Base10 mode is "000001010100". After a mode indicator and a length are added, a final encoding result for the character field "0124" is the binary character string S1 "001100000001010100". The character "0" corresponds to a decimal value "0" in a coding index table for the Base10 mode. Because a quantity of coded bits in the Base10 mode is 3, the decimal value "0" may be converted into a three-bit binary character "000". Therefore, the character "0" may be encoded into the binary character "000" based on the Base10 mode. Similarly, the character "1" may be encoded into a binary character "ow" based on the Base10 mode, the character "2" may be encoded into a binary character "ow" based on the Base10 mode, and the character "4" may be encoded into a binary character "100" based on the Base10 mode.

Figure 6B:
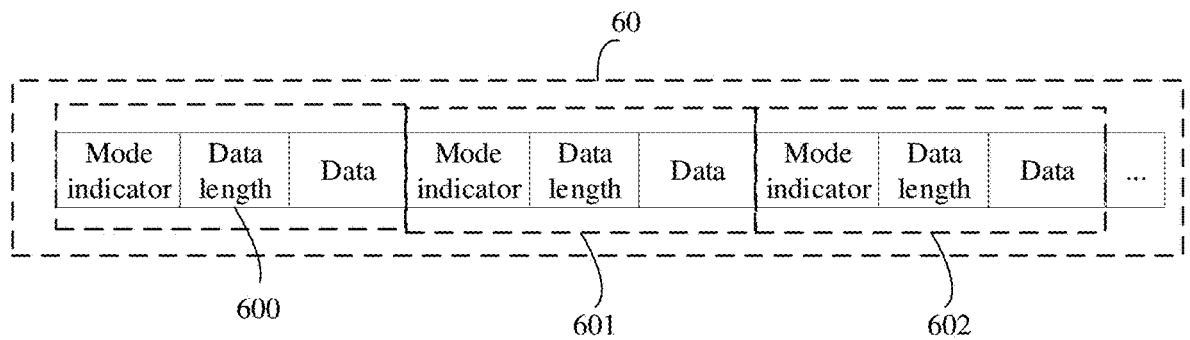
FIG. 6B is a schematic diagram of a format of an encoding result for a character string according to an embodiment of this application.

Further, a format of an encoding result, namely, the binary character string S, for the N characters in the to-be-encoded text may be shown in FIG. 6B. As shown in FIG. 6B, a binary character string 60 may include encoding results (for example, a binary character string 60 (including a mode indicator, a length, and data), a binary character string 601 (including a mode indicator, a length, and data), and a binary character string 602 (including a mode indicator, a length, and data)) for a plurality of character fields. The N characters "0124FEAabcd" shown in Table 14 and the segmentation results for the N characters "0124FEAabcd" are used below as examples for description. An encoding result, namely, the binary character string S, for the N characters "0124FEAabcd" may be shown in Table 17 below.

TABLE 17

| N characters | | | 0124FEAabcd | | | |
|---|---|---|---|---|---|---|
| | Character field<br>Target coding mode | | 0124<br>Base10 mode | | | |
| | | Mode | Length | Data | | |
| | | indicator | (4) | 0 | 1 | 2 | 4 |
| | Encoding result (a binary character string S1) for the character field | 001 | 100 | 000 | 001 | 010 | 100 |
| | Character field<br>Target coding mode | | FEA<br>Base16_U mode | | | |
| | | Mode | Length | Data | | |
| | | indicator | (3) | F | E | A |
| | Encoding result (a binary character string S2) for the character field | 010 | 011 | 1111 | 1110 | 1010 |

TABLE 17-continued

| Character field | abcd | | | | |
|---|---|---|---|---|---|
| Target coding mode | Base16_L mode | | | | |
| | Mode indicator | Length (4) | Data | | |
| | | | a | b | c | d |
| Encoding result (a binary character string S3) for the character field | 001 | 100 | 1010 | 1011 | 1100 | 1101 |

| | Binary character string S1 | Binary character string S2 | Binary character string S3 |
|---|---|---|---|
| Binary character string S | 001100000001010100 | 010011111111101010 | 001100101010111101101 |
| | 0011000000010101000100111111111010100011001010111101 | | |

As shown in Table 17, the N characters "0124FEAabcd" may be grouped into the character field "0124", the character field "FEA", and the character field "abed". After the character field "0124" is encoded based on the target mode, namely, the Base10 mode, the binary character string S1 "001100000001010100" may be obtained. After the character field "FEA" is encoded based on the target mode, namely, the Base16_U mode, the binary character string S2 "010011111111101010" may be obtained. After the character field "abed" is encoded based on the target coding mode, namely, the Base16_L mode, the binary character string S3 "00110010101011 nm" may be obtained. The encoding result for the N characters "0124FEAabcd" is the binary character string S. The binary character string S may include the binary character string S1, the binary character string S2, and the binary character string S3. Therefore, the binary character string S may be "001100000001010100 010001111111110101000110010101011101". For an encoding result for each character in the character field "0124", the character field "FEA", and the character field "abed", refer to the descriptions of the encoding result for the character "0" in the character field "0124" in Table 16. Details are not described herein again.

It can be understood that, because the Base10 mode, the Base16_U mode, and the Base16_L mode are sub-modes of the hybrid coding mode Structured_Append, the mode indicator "0011" for the hybrid coding mode Structured_Append may be added before the binary character string S obtained through encoding. Optionally, "1011" indicating a total length (11 characters in total) of the character string may be further added after the mode indicator "0011" for the hybrid coding mode Structured_Append. Therefore, a final binary character string S may be "0011101100110 000000101 010001001111111101010001100101 0101 11101".

Figure 6C:
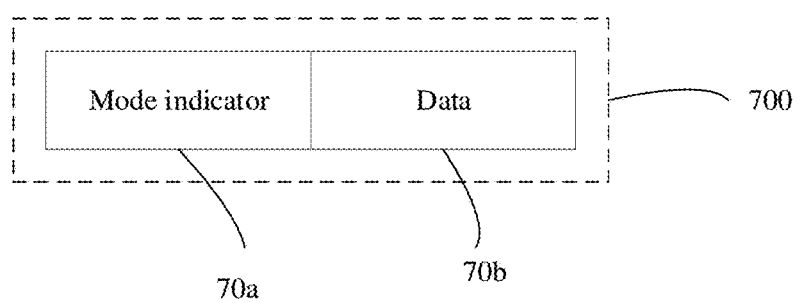
FIG. 6C is a schematic diagram of a format of an encoding result for another character field according to an embodiment of this application.

Optionally, when a quantity of characters in the M character fields is fixed, a format of an encoding result for the character field may alternatively be an encoding format shown in FIG. 6C. Compared with the encoding format shown in FIG. 6A, the encoding format in FIG. 6C may not include a data length. For example, in the character fields shown in Table 13, each character field includes only one character. In this case, a format of an encoding result, that is, a binary character string obtained through encoding, for the character field may be the format shown in FIG. 6C. A format of an encoding result for the character string shown in Table 13 may be shown in FIG. 6D. A character string 70 in FIG. 6D may include character strings (for example, a character string 700 (including a mode indicator and data), a character string 701 (including a mode indicator and data), and a character string 702 (including a mode indicator and data)) obtained by encoding a plurality of character fields. Herein, refer to the foregoing descriptions of FIG. 6A and FIG. 6B. Details are not described herein again.

It can be understood that a format of a binary character string in this embodiment of this application is not limited to the formats shown in FIG. 6B and FIG. 6D. The format of the binary character string may have more forms. For example, the format of the binary character string may be a format in which a mode indicator is arranged before data, to be specific, "a mode indicator 1 a mode indicator 2 a mode indicator 3 data 1 data 2 data 3", where the mode indicator 1 is a coding mode indication for the data 1, the mode indicator 2 is a coding mode indication for the data 2, and the mode indicator 3 is a coding mode indication for the data 3. This is not limited herein.

It can be understood that the binary character string S finally obtained through encoding may vary based on different grouping results for the N characters. For example, an encoding result obtained by encoding the N characters "0124FEAabcd" based on the character fields obtained through grouping shown in Table 13 may be different from an encoding result for the character fields shown in Table 14.

It can be understood that, that the quantity of coded bits corresponding to the character length in Table 16 and Table 17 is 3 is merely an example for description. A larger character length of a character field and a larger character length of a character string indicate a larger quantity of coded bits corresponding to the character length. When a quantity of coded bits is 3, a character field or a character string including a maximum of seven characters can be represented. When a quantity of coded bits is 4, a character field or a character string including a maximum of 15 characters can be represented. In this embodiment of this application, a quantity of coded bits corresponding to a character length may be set to a fixed value. To be specific, a character in each character field may be encoded based on a specified quantity of coded bits. A quantity of coded bits corresponding to a character length is not limited in this embodiment of this application. For example, the quantity of coded bits may be 3 shown in Table 16 and Table 17, may be 4, may be 8, or may be a larger value.

S105: The electronic device 100 generates a target two-dimensional code of a corresponding version based on a length of the binary character string S.

Because two-dimensional codes of different versions have different data capacities, the electronic device 100 needs to generate a two-dimensional code of a corresponding version based on the length of the binary character string S. The target two-dimensional code of the version corresponding to the length of the binary character string S means that a data capacity of the target two-dimensional code of the version is greater than or equal to the length of the binary character string S.

Optionally, the electronic device may encrypt and compress the binary character string S to obtain a binary character string S', and the electronic device may generate a two-dimensional code of a corresponding version based on a length of the binary character string S'. In this way, security of the character string can be improved, and storage space for the character string can be increased.

In a possible implementation, as shown in FIG. 7, that the electronic device 100 generates a two-dimensional code of a corresponding version based on a length of the binary character string S may specifically include the following steps.

S1051: The electronic device 100 may determine a target version of the target two-dimensional code based on the length of the binary character string.

Different versions provide different data storage capacities. A longer binary character string indicates a larger volume of data that needs to be stored. The electronic device 100 determines the target version of the to-be-generated two-dimensional code based on the length of the binary character string.

The six versions of two-dimensional codes shown in FIG. 3A to FIG. 3F are used below as examples for description, and the six versions of two-dimensional codes in FIG. 3A to FIG. 3F are briefly described. It should be noted that, when dot-shaped code elements in the six versions of two-dimensional codes are described below, the dot-shaped code elements herein are all storage locations, and are not equivalent to code elements in a generated two-dimensional code.

Version 1: A code region of a two-dimensional code includes four concentric circle regions.

Figure 8A:
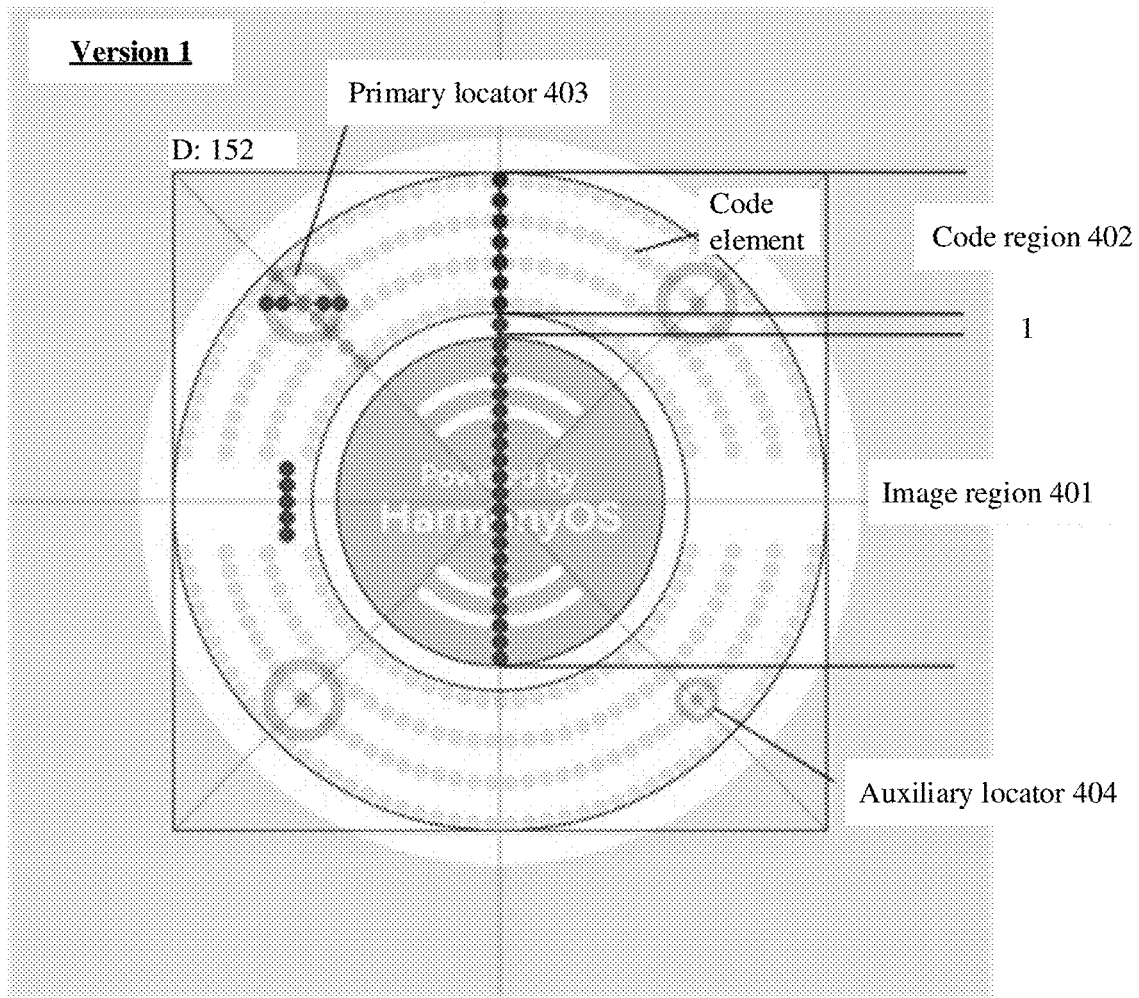
FIG. 8A to FIG. 8F are schematic diagrams of structures of a group of two-dimensional codes according to an embodiment of this application.

As shown in FIG. 8A, an image region 401 of a two-dimensional code in FIG. 8A indicates a brand type (HarmonyOS, HarmonyOS) of the two-dimensional code. It can be learned that, in FIG. 8A, the image region 401 is circular.

A code region 402 includes four concentric circle regions by using a center point of the image region 401 as a circle center. Dot-shaped code elements are evenly arranged in each concentric circle region. Distances between centers of two adjacent dot-shaped code elements in each concentric circle region (or arc lengths between centers of every two adjacent dot-shaped code elements) are the same. Each dot-shaped code element can store information, and the information stored in each dot-shaped code element may be indicated by a color. If a dot-shaped code element stores first information (which may be, for example, a binary 1), the dot-shaped code element is set to be in a first color (for example, black). If a dot-shaped code element stores second information (which may be, for example, a binary value 0), the dot-shaped code element is set to be in a second color (for example, white or a transparent color) or uncolored.

A first spacing exists between the image region 401 and the code region 402. A second spacing exists between every two adjacent concentric circle regions in the code region 402. Each concentric circle region includes an inner ring and an outer ring. A width of the concentric circle region is a difference between a radius of the inner ring and a radius of the outer ring. The second spacing is a spacing between an outer ring of a smaller concentric circle region and an inner ring of a larger concentric circle region in two adjacent concentric circle regions. A third spacing exists between two adjacent dot-shaped code elements in each concentric circle region. For example, in FIG. 8A, if a diameter of one dot-shaped code element is 1, a radius of the image region 401 is 10, and a spacing between the image region 401 and the code region 402 is 1, that is, the first spacing is 1 or a diameter of one dot-shaped code element; a width of each concentric circle region in the code region 402 is 1, that is, a diameter of one dot-shaped code element; a spacing between every two adjacent concentric circle regions in the code region 402 is 1, that is, the second spacing is 1 or a diameter of one dot-shaped code element; and a spacing between two adjacent dot-shaped code elements in each concentric circle region may be 0 or an arc with a same central angle, that is, the third spacing may be 0 or an arc with a same central angle.

In some embodiments, the four concentric circle regions each are divided into an upper-half region and a lower-half region, and a fourth spacing exists between the upper-half region and the lower-half region. For example, in FIG. 8A, if a diameter of one dot-shaped code element is 1, a spacing between the upper-half region and the lower-half region is 5.

A locator region is in the two-dimensional code. For example, FIG. 8A includes three primary locators 403 and one auxiliary locator 404. Outer contours of the three primary locators 403 and the auxiliary locator 404 are all circular. Centers of the primary locators 403 are all in a penultimate concentric circle region from a periphery. A diameter of one dot-shaped code element is 1. In this case, a diameter of the three primary locators 403 is 5.

Version 2: A code region of a two-dimensional code includes five concentric circle regions.

Figure 8B:
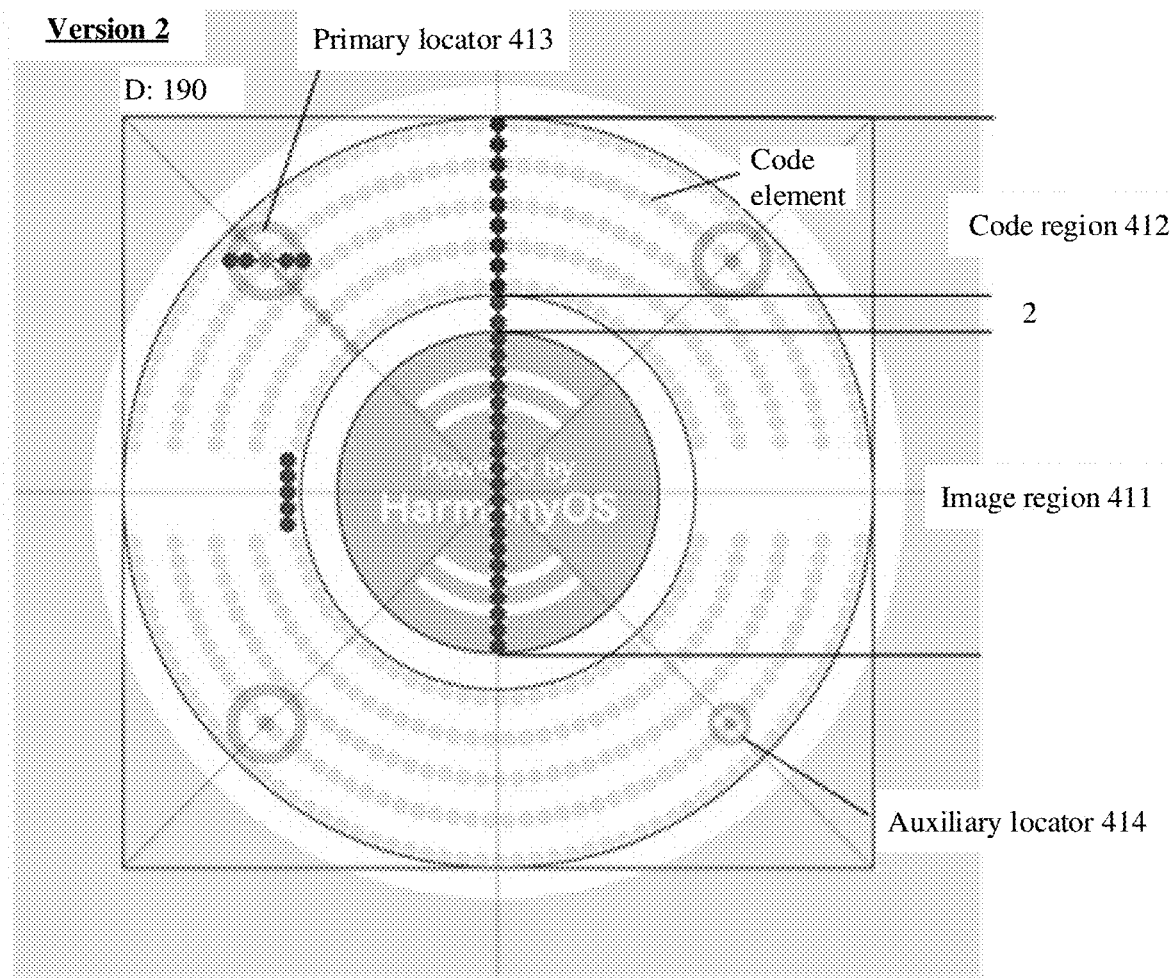

As shown in FIG. 8B, an image region 411 of a two-dimensional code in FIG. 8A indicates a brand type (HarmonyOS, HarmonyOS) of the two-dimensional code. A code region 412 includes five concentric circle regions by using a center point of the image region 411 as a circle center. Dot-shaped code elements are evenly arranged in each concentric circle region. Distances between centers of two adjacent dot-shaped code elements in each concentric circle region (or arc lengths between centers of every two adjacent dot-shaped code elements) are the same.

A first spacing exists between the image region 411 and the code region 412. A second spacing exists between every two adjacent concentric circle regions in the code region 412. A third spacing exists between two adjacent dot-shaped code elements in each concentric circle region. For example, in FIG. 8B, if a diameter of one dot-shaped code element is 1, a radius of the image region 411 is 10, and a spacing between the image region 411 and the code region 412 is 2, that is, the first spacing is 2 or diameters of two dot-shaped code elements; a spacing between every two adjacent concentric circle regions in the code region 412 is 1, that is, the second spacing is 1 or a diameter of one dot-shaped code element; and a spacing between two adjacent dot-shaped code elements in each concentric circle region may be 0 or an arc with a same central angle, that is, the third spacing may be 0 or an arc with a same central angle.

In some embodiments, the four concentric circle regions each are divided into an upper-half region and a lower-half region, and a fourth spacing exists between the upper-half region and the lower-half region. For example, in FIG. 8B, if a diameter of one dot-shaped code element is 1, a spacing between the upper-half region and the lower-half region is 5.

A locator region is in the two-dimensional code. For example, FIG. 8B includes three primary locators 413 and one auxiliary locator 414. Outer contours of the three primary locators 413 and the auxiliary locator 414 are all circular. Centers of the primary locators 413 are all in a penultimate concentric circle region from a periphery. A diameter of one dot-shaped code element is 1. In this case, a diameter of the three primary locators 413 is 5.

Version 3: A code region of a two-dimensional code includes eight concentric circle regions.

Figure 8C:
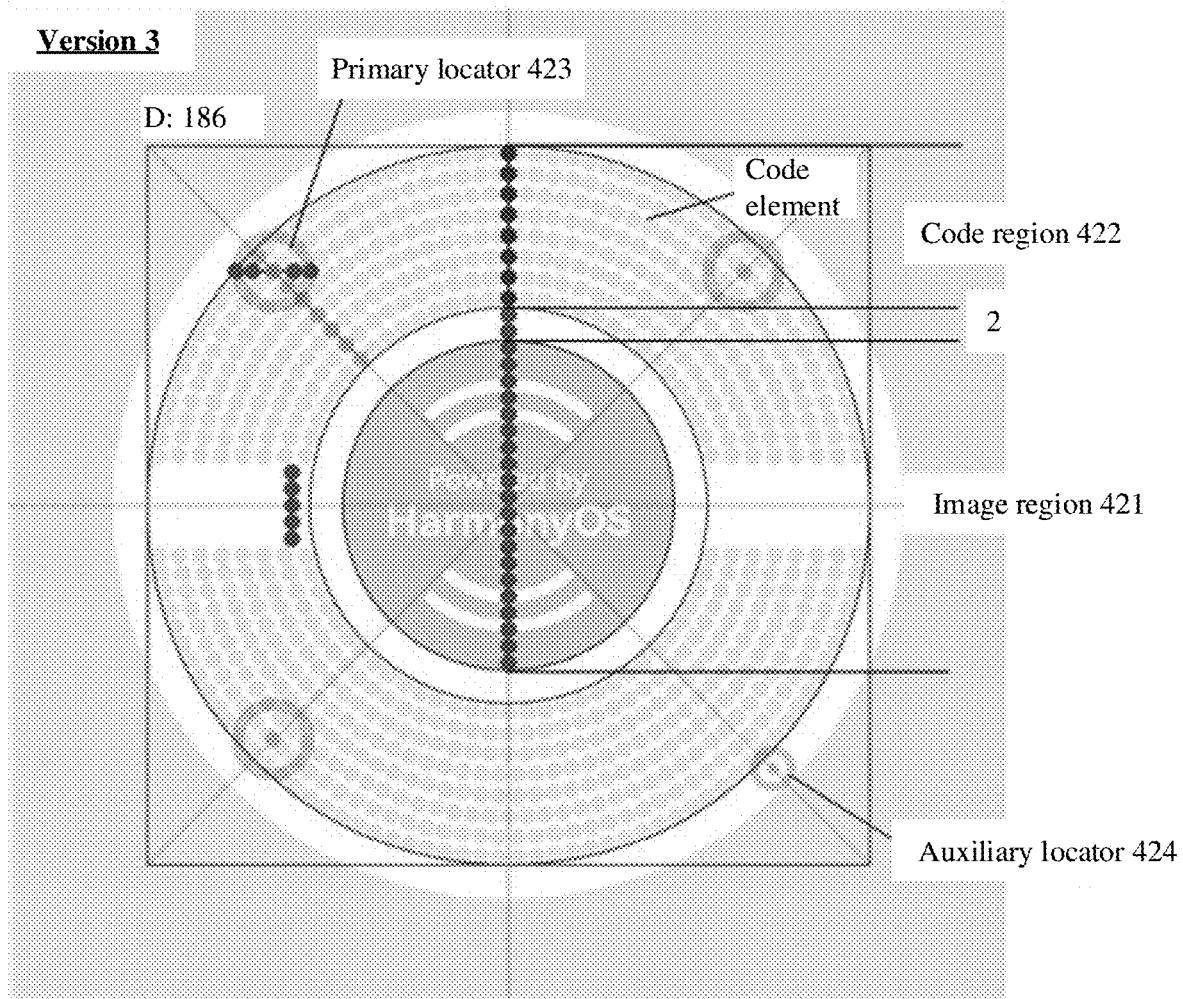

As shown in FIG. 8C, an image region 421 of a two-dimensional code in FIG. 8C indicates a brand type (HarmonyOS, HarmonyOS) of the two-dimensional code. A code region 422 includes eight concentric circle regions by using a center point of the image region 421 as a circle center. Dot-shaped code elements are evenly arranged in each concentric circle region. Distances between centers of two adjacent dot-shaped code elements in each concentric circle region (or arc lengths between centers of every two adjacent dot-shaped code elements) are the same.

A first spacing exists between the image region 421 and the code region 422. A second spacing exists between every two adjacent concentric circle regions in the code region 422. A third spacing exists between two adjacent dot-shaped code elements in each concentric circle region. For example, in FIG. 8C, if a diameter of one dot-shaped code element is 1, a radius of the image region 421 is 10, and a spacing between the image region 421 and the code region 422 is 2, that is, the first spacing is 2 or diameters of two dot-shaped code elements; a spacing between every two adjacent concentric circle regions in the code region 422 is less than 1, that is, the second spacing may be between 0 and 1; and a spacing between two adjacent dot-shaped code elements in each concentric circle region may be 0 or an arc with a same central angle, that is, the third spacing may be 0 or an arc with a same central angle.

In some embodiments, the eight concentric circle regions each are divided into an upper-half region and a lower-half region, and a fourth spacing exists between the upper-half region and the lower-half region. For example, in FIG. 8C, if a diameter of one dot-shaped code element is 1, a spacing between the upper-half region and the lower-half region is 5.

A locator region is in the two-dimensional code. For example, FIG. 8C includes three primary locators 423 and one auxiliary locator 424. Outer contours of the three primary locators 423 and the auxiliary locator 424 are all circular. Centers of the primary locators 423 are all in a penultimate concentric circle region from a periphery. A diameter of one dot-shaped code element is 1. In this case, a diameter of the three primary locators 423 is 5.

Version 4: A code region of a two-dimensional code includes 10 concentric circle regions.

Figure 8D:
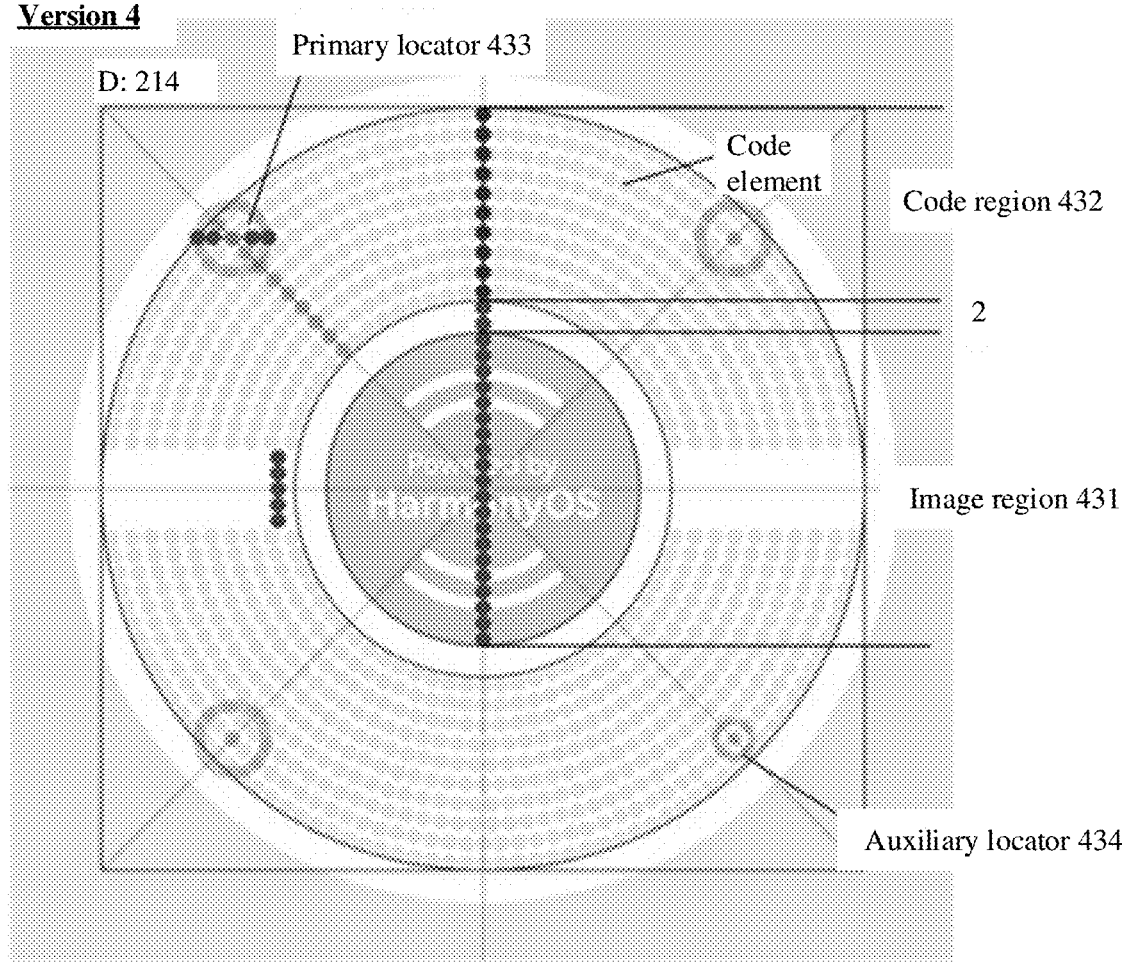

As shown in FIG. 8D, an image region 431 of a two-dimensional code in FIG. 8D indicates a brand type (HarmonyOS, HarmonyOS) of the two-dimensional code. A code region 432 includes 10 concentric circle regions by using a center point of the image region 431 as a circle center. Dot-shaped code elements are evenly arranged in each concentric circle region. Distances between centers of two adjacent dot-shaped code elements in each concentric circle region (or arc lengths between centers of every two adjacent dot-shaped code elements) are the same.

A first spacing exists between the image region 431 and the code region 432. A second spacing exists between every two adjacent concentric circle regions in the code region 432. A third spacing exists between two adjacent dot-shaped code elements in each concentric circle region. For example, in FIG. 8D, if a diameter of one dot-shaped code element is 1, a radius of the image region 431 is 10, and a spacing between the image region 431 and the code region 432 is 2, that is, the first spacing is 2 or diameters of two dot-shaped code elements; a spacing between every two adjacent concentric circle regions in the code region 432 is less than 1, that is, the second spacing may be between 0 and 1; and a spacing between two adjacent dot-shaped code elements in each concentric circle region may be 0 or an arc with a same central angle, that is, the third spacing may be 0 or an arc with a same central angle.

In some embodiments, the four concentric circle regions each are divided into an upper-half region and a lower-half region, and a fourth spacing exists between the upper-half region and the lower-half region. For example, in FIG. 8D, if a diameter of one dot-shaped code element is 1, a spacing between the upper-half region and the lower-half region is 5.

A locator region is in the two-dimensional code. For example, FIG. 8D includes three primary locators 433 and one auxiliary locator 434. Outer contours of the three primary locators 433 and the auxiliary locator 434 are all circular. Centers of the primary locators 433 are all in a penultimate concentric circle region from a periphery. A diameter of one dot-shaped code element is 1. In this case, a diameter of the three primary locators 433 is 5.

Version 5: A code region of a two-dimensional code includes 11 concentric circle regions.

Figure 8E:
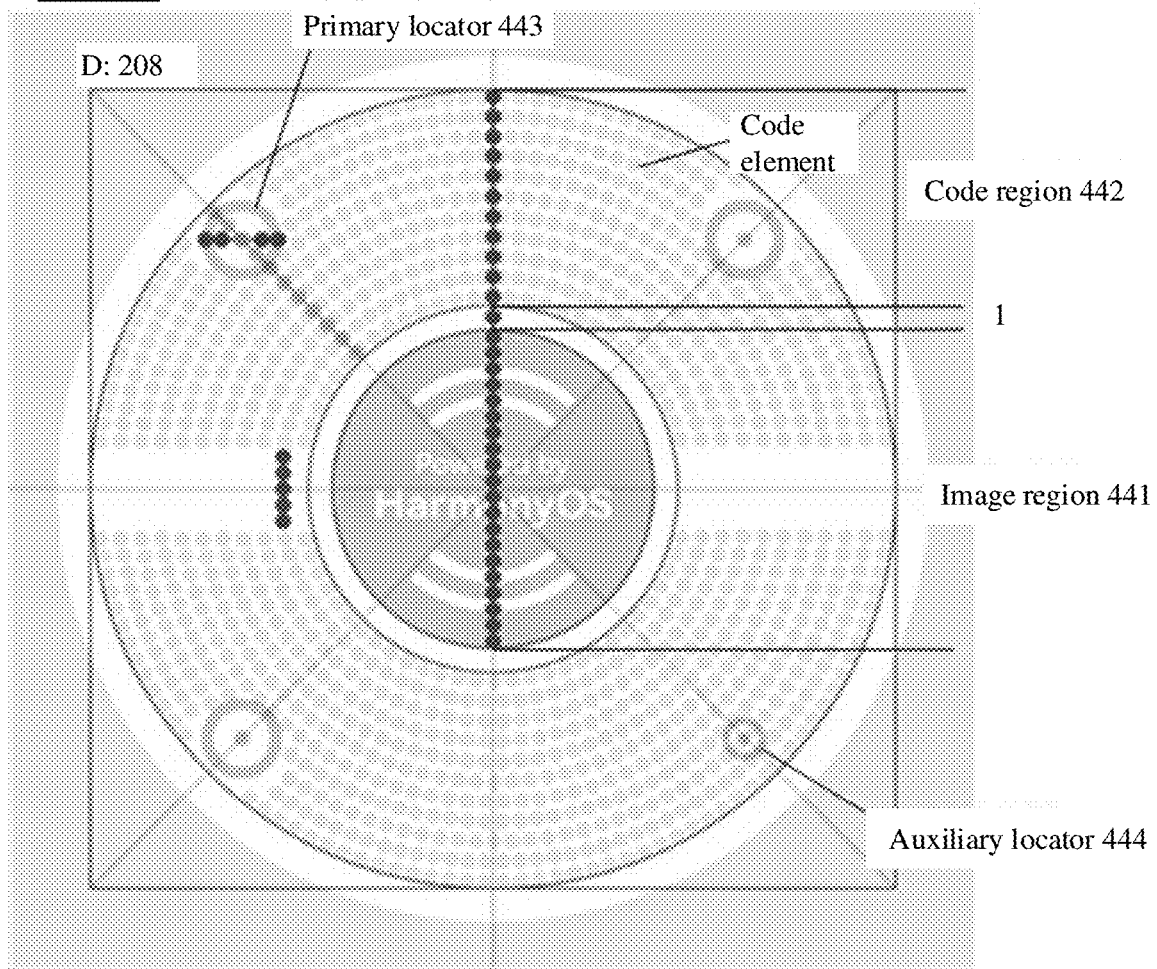

As shown in FIG. 8E, an image region 441 of a two-dimensional code in FIG. 8E indicates a brand type (HarmonyOS, HarmonyOS) of the two-dimensional code. A code region 442 includes 11 concentric circle regions by using a center point of the image region 441 as a circle center. Dot-shaped code elements are evenly arranged in each concentric circle region. Distances between centers of two adjacent dot-shaped code elements in each concentric circle region (or arc lengths between centers of every two adjacent dot-shaped code elements) are the same.

A first spacing exists between the image region 441 and the code region 442. A second spacing exists between every two adjacent concentric circle regions in the code region 442. A third spacing exists between two adjacent dot-shaped code elements in each concentric circle region. For example, in FIG. 8E, if a diameter of one dot-shaped code element is 1, a radius of the image region 441 is 10, and a spacing between the image region 441 and the code region 442 is 1, that is, the first spacing is 1 or a diameter of one dot-shaped code element; a spacing between every two adjacent concentric circle regions in the code region 442 is less than 1, that is, the second spacing may be between 0 and 1; and a spacing between two adjacent dot-shaped code elements in each concentric circle region may be 0 or an arc with a same central angle, that is, the third spacing may be 0 or an arc with a same central angle.

In some embodiments, the 11 concentric circle regions each are divided into an upper-half region and a lower-half region, and a fourth spacing exists between the upper-half region and the lower-half region. For example, in FIG. 8E, if a diameter of one dot-shaped code element is 1, a spacing between the upper-half region and the lower-half region is 5.

A locator region is in the two-dimensional code. For example, FIG. 8E includes three primary locators 443 and one auxiliary locator 444. Outer contours of the three primary locators 443 and the auxiliary locator 444 are all circular. Centers of the primary locators 443 are all in a penultimate concentric circle region from a periphery. A diameter of one dot-shaped code element is 1. In this case, a diameter of the three primary locators 443 is 5.

Version 6: A code region of a two-dimensional code includes 13 concentric circle regions.

Figure 8F:
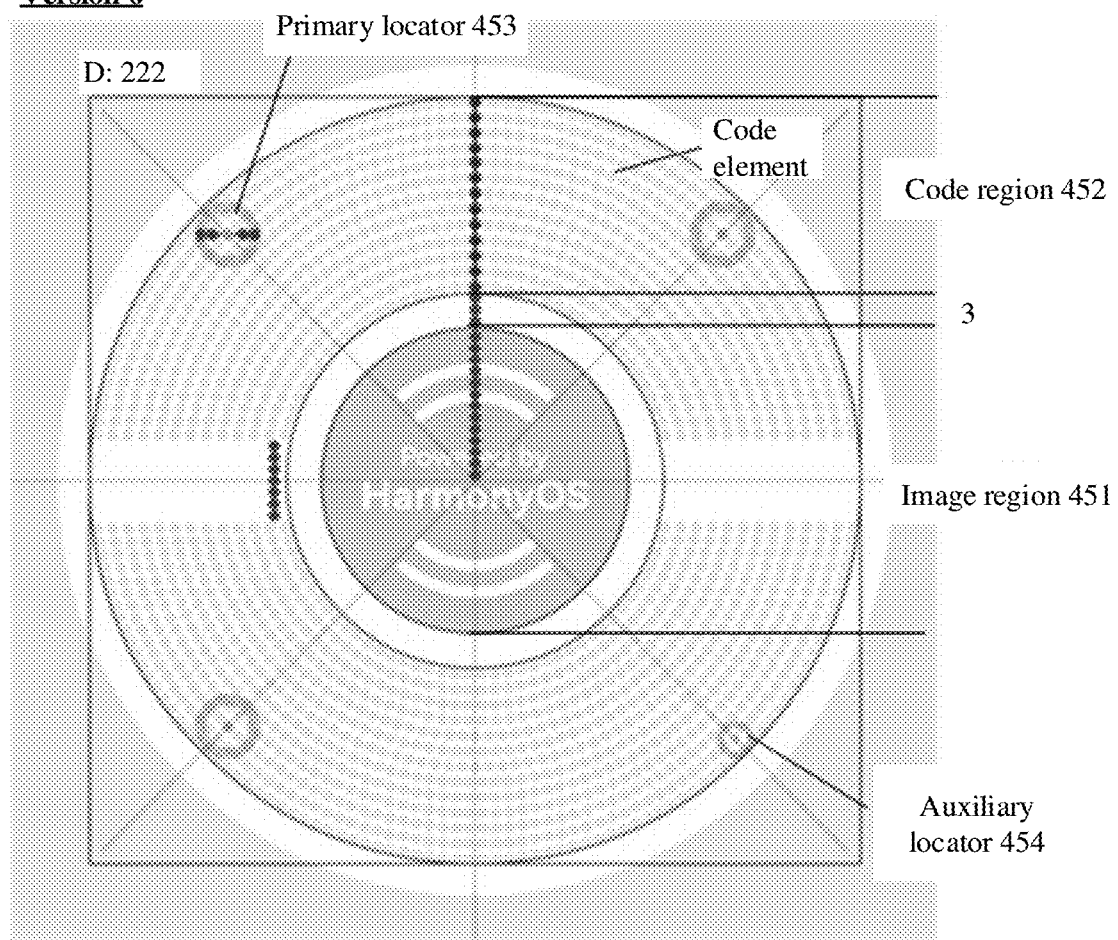

As shown in FIG. 8F, an image region 451 of a two-dimensional code in FIG. 8F indicates a brand type (HarmonyOS, HarmonyOS) of the two-dimensional code. A code region 452 includes 13 concentric circle regions by using a center point of the image region 451 as a circle center. Dot-shaped code elements are evenly arranged in each concentric circle region. Distances between centers of two adjacent dot-shaped code elements in each concentric circle region (or arc lengths between centers of every two adjacent dot-shaped code elements) are the same.

A first spacing exists between the image region 451 and the code region 452. A second spacing exists between every two adjacent concentric circle regions in the code region 452. A third spacing exists between two adjacent dot-shaped code elements in each concentric circle region. For example, in FIG. 8F, if a diameter of one dot-shaped code element is 1, a radius of the image region 451 is 13, and a spacing between the image region 451 and the code region 452 is 3, that is, the first spacing is 3 or diameters of three dot-shaped code elements; a spacing between every two adjacent concentric circle regions in the code region 452 is less than 1, that is, the second spacing may be between 0 and 1; and a spacing between two adjacent dot-shaped code elements in each concentric circle region may be 0 or an arc with a same central angle, that is, the third spacing may be 0 or an arc with a same central angle.

In some embodiments, the four concentric circle regions each are divided into an upper-half region and a lower-half region, and a fourth spacing exists between the upper-half region and the lower-half region. For example, in FIG. 8F, if a diameter of one dot-shaped code element is 1, a spacing between the upper-half region and the lower-half region is 7.

A locator region is in the two-dimensional code. For example, FIG. 8F includes three primary locators 453 and one auxiliary locator 454. Outer contours of the three primary locators 453 and the auxiliary locator 454 are all circular. Centers of the primary locators 453 are all in a penultimate concentric circle region from a periphery. A diameter of one dot-shaped code element is 1. In this case, a diameter of the three primary locators 453 is 5.

It can be understood that a larger quantity of concentric circle regions and a larger quantity of dot-shaped code elements indicate a larger data storage capacity of the version. A quantity of concentric circle regions in a two-dimensional code and a quantity of dot-shaped code elements in each concentric circle region are not limited to the foregoing six versions, and may be configured in another manner. This is not limited in this application.

S1052: The electronic device 100 may allocate, based on locations of an image region, a code region, and a locator in the target version of the target two-dimensional code, the binary character string S to concentric circle regions in the code region to obtain two-dimensional code information.

The electronic device 100 performs ring-based splitting on the binary character string based on the locations of the image region, the code region, and the locator in a structure of the target version of the to-be-generated two-dimensional code, to allocate the binary character string to dot-shaped code elements in the concentric circle regions in the code region, to obtain the two-dimensional code information.

Specifically, the binary character string may be split into substrings corresponding to concentric circle regions based on a quantity of concentric circle regions in the code region in the structure of the two-dimensional code and an information capacity (positively correlated with a quantity of dot-shaped code elements) of each concentric circle region, and each substring is allocated to a dot-shaped code element in a corresponding concentric circle region for storage.

The two-dimensional code information includes information correspondingly stored in each dot-shaped code element. For example, a dot-shaped code element at a first location stores first information, and a dot-shaped code element at a second location stores second information, where the first location and the second location indicate center coordinates and radius information of the dot-shaped code elements. For example, the first information may be 1 in the binary character string, and the second information may be 0 in the binary character string.

In some embodiments, the two-dimensional code information may further include a display form corresponding to each dot-shaped code element. For example, the dot-shaped code element storing the first information is correspondingly set to be in a first color, and the dot-shaped code element storing the second information is correspondingly set to be in a second color. For example, the first color may be black, and the second color may be white, a transparent color, or being uncolored.

In some embodiments, the electronic device wo further splits a substring corresponding to a concentric circle region into two substrings, where the two substrings are correspondingly stored in an upper-half region and a lower-half region of the concentric circle region respectively; or may further split a substring corresponding to a concentric circle region into four substrings, where the four substrings are correspondingly stored in regions in four quadrants of the concentric circle region respectively.

The electronic device wo fills dot-shaped code elements in concentric circle regions of the two-dimensional code of the target version with the binary character string. A filling direction may be as follows: An innermost concentric circle region is first filled, and then an outer concentric circle region is sequentially filled; or an outermost concentric circle region is first filled, and then an inner concentric circle region is sequentially filled. Alternatively, the filling direction may be a direction from left to right or from top to bottom, or the like. This is not limited in this embodiment of this application.

If there is a reserved region (for example, a reserved region for format information or a reserved region for version information) or a functional module region (for example, a locator region, a calibration module region, or a time module region), a code element at the location is not filled, and only a next idle code element is filled.

S1053: The electronic device wo selects a mask mode for the target two-dimensional code, and adds mask information.

A mask is a policy for changing a value of a code element in the code region of the two-dimensional code according to a specific rule. A purpose of using the mask is to adjust display effect of code elements in the two-dimensional code (for example, avoid a large area of blank or black blocks in the two-dimensional code that affects scanning and recognition), so that a code reader can read information as easily as possible.

The mask mode includes: For example, all even-numbered concentric circle regions in the two-dimensional code are masked. For another example, some dot-shaped code elements in each concentric circle region in the two-dimensional code are masked. The electronic device 100 performs mask superposition on the two-dimensional code information based on the mask mode, to adjust a layout of the two-dimensional code information, so that code elements in the two-dimensional code information are distributed more evenly, and a generated two-dimensional code has more appealing appearance.

Specifically, the performing mask superposition on the two-dimensional code information by using the mask may be implemented by performing an exclusive-OR operation on the binary character string of the two-dimensional code information and the mask.

In some embodiments, the electronic device 100 fills the code region with the two-dimensional code information including the mask information, and the electronic device 100 verifies whether the target version meets a capacity requirement of the to-be-generated two-dimensional code, and if the target version meets the capacity requirement, adds version information.

S1054: The electronic device generates the target two-dimensional code.

In this embodiment of this application, the electronic device 100 may encode the code region of the two-dimensional code in a manner of leaving an unavailable region vacant. After encoding the code region of the two-dimensional code to obtain the two-dimensional code information, the electronic device 100 draws, in the first color based on the two-dimensional code information by using a drawing algorithm, the dot-shaped code element that stores the first information in the code region; and draws, in the second color, the dot-shaped code element that stores the second information, to complete drawing of the code region. In addition, the electronic device wo fills corresponding regions such as the image region and the locator region in the target version, to obtain a complete two-dimensional code image. The unavailable region includes the image region and the locator region in the target version of the two-dimensional code, a blank region in the code region (for example, a blank region with a spacing of 5 between the upper-half region and the lower-half region in FIG. 8A), and the like.

In some embodiments, the electronic device wo connects dot-shaped code elements that meet a preset condition and draws the dot-shaped code elements into an arc-shaped code element. The preset condition includes: If more than two consecutive adjacent dot-shaped code elements in one concentric circle region all store the first information, the more than two adjacent dot-shaped code elements are connected and drawn into an arc-shaped code element, where the arc-shaped code element is drawn in the first color. Optionally, a part for connecting dot-shaped code elements in the arc-shaped code element is also filled in the first color. This can improve appearance of the two-dimensional code. Similarly, if more than two consecutive adjacent dot-shaped code elements in one concentric circle region all store the second information, the more than two adjacent dot-shaped code elements are connected and drawn into an arc-shaped code element, where the arc-shaped code element is drawn in the second color.

The following separately describes examples of two-dimensional code images generated based on the foregoing six versions of two-dimensional codes.

When the target version is the version 1, an example of a generated two-dimensional code is shown in FIG. 3A. FIG. 3A includes four concentric circle regions. Based on the version 1, in the version 1, some dot-shaped code elements are drawn in black, some dot-shaped code elements are drawn in white or a transparent color or are uncolored, and consecutive adjacent dot-shaped code elements that are drawn in black are connected and drawn into an arc-shaped code element.

When the target version is the version 2, an example of a generated two-dimensional code is shown in FIG. 3B. FIG. 3B includes five concentric circle regions. Based on the version 2, in the version 2, some dot-shaped code elements are drawn in black, some dot-shaped code elements are drawn in white or a transparent color or are uncolored, and consecutive adjacent dot-shaped code elements that are drawn in black are connected and drawn into an arc-shaped code element.

When the target version is the version 3, an example of a generated two-dimensional code is shown in FIG. 3C. FIG. 3C includes eight concentric circle regions. Based on the version 3, in the version 3, some dot-shaped code elements are drawn in black, some dot-shaped code elements are drawn in white or a transparent color or are uncolored, and consecutive adjacent dot-shaped code elements that are drawn in black are connected and drawn into an arc-shaped code element.

When the target version is the version 4, an example of a generated two-dimensional code is shown in FIG. 3D. FIG. 3D includes 10 concentric circle regions. Based on the version 4, in the version 4, some dot-shaped code elements are drawn in black, some dot-shaped code elements are drawn in white or a transparent color or are uncolored, and consecutive adjacent dot-shaped code elements that are drawn in black are connected and drawn into an arc-shaped code element.

When the target version is the version 5, an example of a generated two-dimensional code is shown in FIG. 3E. FIG. 3E includes 11 concentric circle regions. Based on the version 5, in the version 5, some dot-shaped code elements are drawn in black, some dot-shaped code elements are drawn in white or a transparent color or are uncolored, and consecutive adjacent dot-shaped code elements that are drawn in black are connected and drawn into an arc-shaped code element.

When the target version is the version 6, an example of a generated two-dimensional code is shown in FIG. 3F. FIG. 3F includes 13 concentric circle regions. Based on the version 6, in the version 6, some dot-shaped code elements are drawn in black, some dot-shaped code elements are drawn in white or a transparent color or are uncolored, and consecutive adjacent dot-shaped code elements that are drawn in black are connected and drawn into an arc-shaped code element.

It can be understood that the two-dimensional code encoding method provided in this embodiment of this application may be obtained based on any combination of step S101 to step S105. Alternatively, the two-dimensional code encoding method provided in this embodiment of this application may be obtained based on a combination of steps associated with step S101 to step S105, or may be a two-dimensional code encoding method obtained based on a combination with an alternative solution for any one of step S101 to step S105. For example, step S102 may be replaced with the following: The electronic device determines character types of the N characters, and determines a target coding mode corresponding to each character type.

This embodiment of this application provides a two-dimensional code encoding method. In the method, an electronic device wo may obtain to-be-encoded text, where the to-be-encoded text may include N characters; the electronic device 100 determines one or more candidate coding modes for each of the N characters from X optional coding modes, and selects, from the one or more candidate coding modes, a candidate coding mode with a smallest quantity of coded bits as a target coding mode for each character, where X is a positive number; the electronic device 100 groups the N characters into M character fields based on the target coding mode for each of the N characters, and determines target coding modes for the M character fields, where each of the M character fields includes one or more characters; the electronic device wo encodes the M character fields based on the target code for the M character fields to obtain a binary character string S; and the electronic device wo generates a target two-dimensional code of a corresponding version based on a length of the binary character string S. In this way, the electronic device wo can encode the to-be-encoded text into a shorter binary character string of a shorter length, so that a data capacity of a two-dimensional code is increased. Therefore, longer to-be-encoded text can be encoded to generate a two-dimensional code.

For example, a character string "0124FEAabcd" may be encoded into a 54-bit binary character string "001100000001010100010011111111101010001100101010111101" according to the two-dimensional code encoding method provided in this embodiment of this application. According to an encoding method in the conventional technology, the electronic device wo directly encodes the character string "0124FEAabcd" as a whole based on the Base128 coding mode, to obtain an 84-bit binary character string. In the Base128 coding mode, a quantity of coded bits is 7, and each of 11 characters of "0124FEAabcd" needs to be encoded into a 7-bit binary character string to obtain a 77-bit binary character string. Then a 3-bit mode indicator and a 4-bit length indicator are added to obtain the 84-bit binary character string. It can be learned that the binary character string obtained through encoding by using the two-dimensional code encoding method provided in this embodiment of this application is shorter. In this way, the electronic device can generate a two-dimensional code based on a longer character string.

Figure 9:
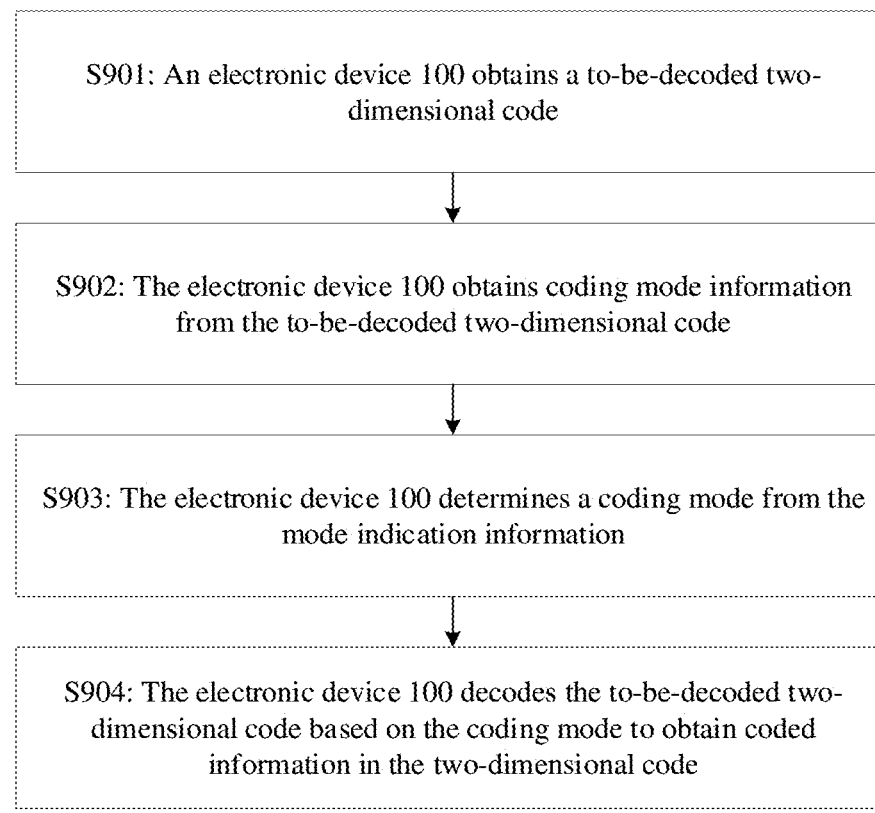
FIG. 9 is a schematic flowchart of a two-dimensional code decoding method according to an embodiment of this application.

Based on the two-dimensional code encoding method provided in the foregoing embodiment, an embodiment of this application further provides a two-dimensional code decoding method. All content related to the foregoing embodiment is applicable to this embodiment, and details are not described herein again. As shown in FIG. 9, the two-dimensional code decoding method may specifically include the following steps.

S901: An electronic device 100 obtains a to-be-decoded two-dimensional code.

The electronic device 100 may obtain the to-be-decoded two-dimensional code through a camera, or the electronic device may obtain the to-be-decoded two-dimensional code from a gallery of the electronic device. The electronic device 100 may alternatively obtain the to-be-decoded two-dimensional code through another electronic device 100. To be specific, the another electronic device sends the to-be-decoded two-dimensional code to the electronic device 100. A manner of obtaining the to-be-decoded two-dimensional code by the electronic device 100 is not limited in this embodiment of this application.

The to-be-decoded two-dimensional code may be the QR code shown in FIG. 1, or may be the two-dimensional code shown in the diagram (a), the diagram (b), or the diagram (c) in FIG. 2, or may be a two-dimensional code of any one of the versions shown in FIG. 3A to FIG. 3F. A type of the two-dimensional code is not limited herein.

The to-be-decoded two-dimensional code may be the two-dimensional code generated according to step S101 to step S105.

In a possible implementation, before the electronic device boo obtains the to-be-decoded two-dimensional code, the electronic device 100 obtains a first image including the to-be-decoded two-dimensional code; and the electronic device boo determines a region of the to-be-decoded two-dimensional code in the first image based on a locator (for example, the primary locators 403 and the auxiliary locator 404 shown in FIG. 8A) in the to-be-decoded two-dimensional code.

Further, before the electronic device 100 determines the region of the to-be-decoded two-dimensional code in the first image, the electronic device 100 may preprocess the first image. The preprocessing may include one or more of grayscale processing, denoising, binarization, expansion, and corrosion. For specific processes of the grayscale processing, the denoising, the binarization, the expansion, and the corrosion, refer to the conventional technology. Details are not described herein.

S902: The electronic device 100 obtains mode indication information from the to-be-decoded two-dimensional code.

The electronic device 100 may obtain the mode indication information from a code region (for example, the code region 402 shown in FIG. 8A) in the to-be-decoded two-dimensional code. The mode indication information may be a binary character string. The electronic device 100 may obtain a binary character string for identifying a coding mode for the to-be-decoded two-dimensional code.

Optionally, the electronic device 100 may obtain version information of the to-be-decoded two-dimensional code, and determine the code region in the to-be-decoded two-dimensional code based on the version information. Then the electronic device 100 may obtain the mode indication information from the code region.

S903: The electronic device 100 determines a coding mode from the mode indication information, where the electronic device stores a mapping relationship table for the mode indication information and the coding mode.

The electronic device 100 may determine the coding mode for the to-be-decoded two-dimensional code based on the mode indication information, for example, a binary character string indicating the coding mode. The electronic device 100 may store the mapping relationship table for the mode indication information and the coding mode. The mapping relationship table may be Table 1 or Table 11 in the foregoing descriptions. If the mode indication information obtained by the electronic device is "0000", the electronic device 100 may determine that the coding mode for the to-be-decoded two-dimensional code is a terminator mode. If the mode indication information obtained by the electronic device 100 is "0011", the electronic device 100 may determine that the coding mode for the to-be-decoded two-dimensional code is a hybrid coding mode. The electronic device 100 may further determine a coding sub-mode for the to-be-decoded two-dimensional code from the mode indication information.

Further, if the electronic device 100 determines that some characters in the code region in the to-be-decoded two-dimensional code further include mode indication information for a coding sub-mode, the electronic device 100 may determine a corresponding coding sub-mode based on the mode indication information for the coding sub-mode. For example, if the mode indication information is a binary character string "000", the electronic device 100 may determine that the coding sub-mode is a Base10 mode.

In a possible implementation, the electronic device 100 obtains a plurality of pieces of mode indication information, for example, a plurality of mode indicators, from the code region, and the electronic device 100 decodes a binary character string based on mode indication information corresponding to the binary character string.

S904: The electronic device 100 decodes the to-be-decoded two-dimensional code based on the coding mode to obtain coded information in the two-dimensional code.

The electronic device 100 decodes the to-be-decoded two-dimensional code based on the determined coding mode. If the electronic device 100 obtains compression indication information from the to-be-decoded two-dimensional code, the electronic device 100 may decompress the to-be-decoded two-dimensional code based on the compression indication information. If the electronic device 100 obtains encryption indication information, the electronic device 100 may further decrypt the to-be-decoded two-dimensional code based on the encryption indication information. Finally, the electronic device 100 may obtain the coded information, for example, "abcd" or "I love my family", in the to-be-decoded two-dimensional code. In this embodiment of this application, the coded information in the two-dimensional code may be referred to as first information.

In a possible implementation, the electronic device boo may determine, from the code region, a quantity of binary bytes included in the code region, a length of each binary byte, and a coding mode. The electronic device 100 may encode each byte based on an encoding length corresponding to the byte. For example, the electronic device boo may determine, from the to-be-decoded two-dimensional code, that the mode indication information is "owl". In this case, the coding mode for the to-be-decoded two-dimensional code is the hybrid coding mode. If a byte length of the coded information is 3, it indicates that the to-be-decoded two-dimensional code is obtained by encoding three binary character strings. The electronic device may obtain a coding sub-mode indicator (for example, "001", indicating that the coding mode is a Base10 mode) and a length indicator (for example, "100", indicating that a quantity of original characters encoded into the binary character strings is 4) for the three binary character strings from the code region, and may finally obtain a specific result for the three binary character strings, for example, "000001010100". "000001010100" may be decoded based on the coding sub-mode to obtain the coded information, that is, numeric characters "0124", in the two-dimensional code.

In a possible implementation, the to-be-decoded two-dimensional code includes a code region, and that the electronic device determines mode indication information from the to-be-decoded two-dimensional code specifically includes: The electronic device obtains the mode indication information from a code element that stores the mode indication information in the code region. In this way, the electronic device can obtain the mode indication information.

In a possible implementation, before the electronic device obtains the mode indication information from the code element that stores the mode indication information in the code region, the method includes: The electronic device obtains version information of the to-be-decoded two-dimensional code, and determines a target version of the to-be-decoded two-dimensional code based on the version information, where the target version indicates coordinate information of each storage location in the code region of the to-be-decoded two-dimensional code. The electronic device determines, based on the coordinate information of each storage location, a binary value corresponding to a storage location occupied by each of a plurality of code elements in the code region of the to-be-decoded two-dimensional code.

In this way, the electronic device can accurately determine a binary value corresponding to each code element in the code region.

Optionally, binary data may be 0 or 1.

In a possible implementation, the electronic device may determine the version information of the to-be-decoded two-dimensional code based on a distance between any two locators in the to-be-decoded two-dimensional code. Different version information corresponds to different distances between any two locators in the two-dimensional code.

In a possible implementation, that the electronic device decodes the to-be-decoded two-dimensional code based on the coding mode to obtain first information includes: The electronic device decodes, based on the coding mode, the binary value corresponding to the storage location occupied by each of the plurality of code elements in the code region of the to-be-decoded two-dimensional code to obtain the first information. Different coding modes correspond to different quantities of coded bits. In this way, the electronic device can accurately decode, based on a coding mode, a binary value with a corresponding quantity of bits to obtain the first information.

In a possible implementation, that the electronic device obtains mode indication information from the to-be-decoded two-dimensional code includes: The electronic device obtains, from the to-be-encoded two-dimensional code, one piece of mode indication information and one or more pieces of sub-mode indication information included in the coding model information.

That the electronic device determines a coding mode for the to-be-decoded two-dimensional code from the mode indication information includes: The electronic device determines the coding mode for the to-be-decoded two-dimensional code from the mode indication information, and determines one or more coding sub-modes for the to-be-decoded two-dimensional code from the one or more pieces of sub-mode indication information.

That the electronic device decodes, based on the coding mode, the binary value corresponding to the storage location occupied by each of the plurality of code elements in the code region of the to-be-decoded two-dimensional code to obtain the first information includes: The electronic device decodes, based on the one or more coding sub-modes, the binary value corresponding to the storage location occupied by each of the plurality of code elements in the code region of the to-be-decoded two-dimensional code to obtain the first information.

The first information may be encoded into the to-be-decoded two-dimensional code by using a plurality of coding sub-modes in a coding mode. In this way, the electronic device can accurately decode, through stepwise decoding, the to-be-decoded two-dimensional code to obtain the first information.

In a possible implementation, the one or more coding sub-modes include a first coding sub-mode and a second coding sub-mode, the code region includes a first code region and a second code region, and that the electronic device decodes, based on the one or more coding sub-modes, the binary value corresponding to the storage location occupied by each of the plurality of code elements in the code region of the to-be-decoded two-dimensional code to obtain the first information includes: The electronic device decodes, based on the first coding sub-mode, a binary value corresponding to a storage location occupied by each of a plurality of code elements in the first code region, and decodes, based on the second coding sub-mode, a binary value corresponding to a storage location occupied by each of a plurality of code elements in the second code region, to obtain the first information. In this way, the electronic device can accurately decode, through stepwise decoding, the to-be-decoded two-dimensional code to obtain the first information.

In a possible implementation, the mode indication information and the one or more pieces of sub-mode indication information are binary characters with fixed quantities of bits.

In a possible implementation, that the electronic device determines a coding mode for the to-be-decoded two-dimensional code from the mode indication information, where the electronic device stores one or more mapping relationship tables, and the mapping relationship table includes the mode indication information and a coding mode corresponding to the mode indication information includes: The electronic device queries the mapping relationship table for the coding mode corresponding to the mode indication information and a quantity of coded bits in the coding mode.

In a possible implementation, that the electronic device determines a coding mode for the to-be-decoded two-dimensional code from the mode indication information, where the electronic device stores one or more mapping relationship tables, and the mapping relationship table includes the mode indication information and a coding mode corresponding to the mode indication information specifically includes: The electronic device queries the mapping relationship table for the coding mode corresponding to the mode indication information and a coding sub-mode, corresponding to each piece of sub-mode indication information, of the one or more coding sub-modes.

In a possible implementation, the to-be-decoded two-dimensional code includes one piece of mode indication information and a plurality of pieces of sub-mode indication information, the first information includes two or more of a numeric character, an uppercase letter character, a lowercase letter character, a special character, and an escape character, and the numeric character, the uppercase letter character, the lowercase letter character, the special character, and the escape character correspond to different target coding modes with smallest quantities of coded bits.

In a possible implementation, each of the one or more coding sub-modes corresponds to one coding index table; the coding index table includes a first coding index table, a second coding index table, a third coding index table, a fourth coding index table, a fifth coding index table, a sixth coding index table, a seventh coding index table, and an eighth coding index table; the first coding index table includes the numeric character; the second coding index table includes the numeric character and the uppercase letter character; the third coding index table includes the numeric character and the lowercase letter character; the fourth coding index table includes the uppercase letter character and the special character; the fifth coding index table includes the lowercase letter character and the special character; the sixth coding index table includes the numeric character, the uppercase letter character, and the special character; the seventh coding index table includes the numeric character, the lowercase letter character, and the special character; and the eighth coding index table includes the numeric character, the uppercase letter character, the lowercase letter character, and the special character.

In a possible implementation, the target version of the to-be-decoded two-dimensional code includes a first version, a second version, a third version, a fourth version, a fifth version, and a sixth version, and the to-be-decoded two-dimensional code has different data capacities based on different target versions of the to-be-decoded two-dimensional code.

It can be understood that the two-dimensional code decoding method provided in this embodiment of this application may be obtained based on any combination of step S901 to step S904. Alternatively, the two-dimensional code decoding method provided in this embodiment of this application may be obtained based on a combination of steps associated with step S901 to step S904, or may be a two-dimensional code decoding method obtained based on a combination with an alternative solution for any one of step S901 to step S904. Step S901 to step S904 are merely examples for description, and constitute no limitation on the two-dimensional code decoding method provided in this embodiment of this application.

In the two-dimensional code decoding method provided in this embodiment of this application, an electronic device 100 obtains a to-be-decoded two-dimensional code; the electronic device 100 obtains mode indication information from the to-be-decoded two-dimensional code; the electronic device 100 determines a coding mode from the mode indication information, where the electronic device stores a mapping relationship table for the mode indication information and the coding mode; and the electronic device 100 decodes the to-be-decoded two-dimensional code based on the coding mode to obtain coded information in the two-dimensional code. In this way, the electronic device 100 can more accurately decode information in the two-dimensional code. The two-dimensional code decoding method provided in this embodiment of this application is used to decode a special binary coded structure obtained through fine-grained encoding. The electronic device may restore fine-grained coded information step by step through block-based decoding, to obtain a coded character string.

The following describes an example electronic device 100 provided in embodiments of this application.

Figure 10:
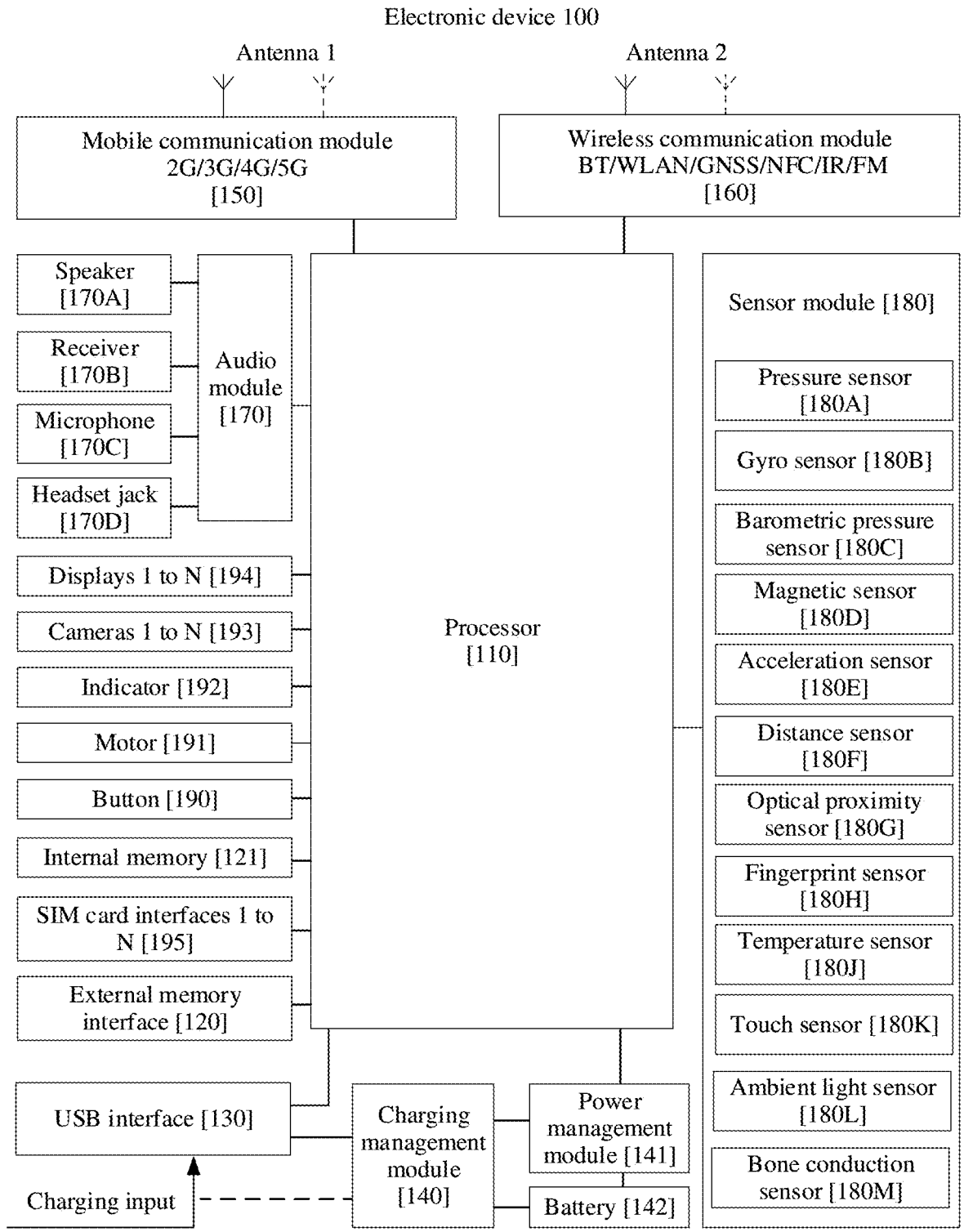
FIG. 10 is a schematic diagram of a structure of an electronic device according to an embodiment of this application.

FIG. 10 is a schematic diagram of a structure of an electronic device 100 according to an embodiment of this application.

The electronic device 100 is used below as an example to describe embodiments in detail. It should be understood that the electronic device 100 may include more or fewer components than those shown in the figure, two or more components may be combined, or there may be different component configurations. Components shown in the figure may be implemented in hardware including one or more signal processing and/or application-specific integrated circuits, software, or a combination of hardware and software.

The electronic device 100 may include a processor no, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 18oF, an optical proximity sensor 180G, a fingerprint sensor 180H, a temperature sensor 180J, a touch sensor 180K, an ambient light sensor 180L, a bone conduction sensor 180M, and the like.

It can be understood that the structure shown in this embodiment of the present invention does not constitute a specific limitation on the electronic device 100. In some other embodiments of this application, the electronic device 100 may include more or fewer components than those shown in the figure, some components may be combined, some components may be split, or there may be different component layouts. The components shown in the figure may be implemented by using hardware, software, or a combination of software and hardware.

The processor no may include one or more processing units. For example, the processor no may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors. The NPU is a neural-network (neural-network, NN) computing processor. The NPU quickly processes input information with reference to a structure of a biological neural network, for example, a transfer mode between human brain neurons, and may further continuously perform self-learning. Applications such as intelligent cognition of the electronic device 100, for example, image recognition, facial recognition, speech recognition, and text understanding, may be implemented through the NPU.

The controller may be a nerve center and a command center of the electronic device 100. The controller may generate an operation control signal based on an instruction operation code and a time sequence signal, to control instruction reading and instruction execution.

In this embodiment of this application, the processor no may be configured to determine a target coding mode for each of N characters of to-be-encoded text, and group the N characters into M character fields based on the target coding mode for each character.

A memory may be further disposed in the processor no to store instructions and data. In some embodiments, the memory in the processor no is a cache. The memory may store instructions or data that has been used or is cyclically used by the processor no. If the processor no needs to use the instructions or the data again, the processor may directly invoke the instructions or the data from the memory. This avoids repeated access, reduces waiting time of the processor no, and improves system efficiency.

The charging management module 140 is configured to receive charging input from a charger. The charger may be a wireless charger or a wired charger.

The power management module 141 is connected to the battery 142, the charging management module 140, and the processor no. The power management module 141 receives input from the battery 142 and/or the charging management module 140, and supplies power to the processor no, the internal memory 121, an external memory, the display 194, the camera 193, the wireless communication module 160, and the like.

A wireless communication function of the electronic device 100 may be implemented by the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed to improve antenna utilization. For example, the antenna 1 may be multiplexed as a diversity antenna in a wireless local area network. In some other embodiments, an antenna may be used in combination with a tuning switch.

The mobile communication module 150 may provide a solution applied to the electronic device 100 for wireless communication such as 2G/3G/4G/5G. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor no. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium- or high-frequency signal. The demodulator is configured to demodulate a received electromagnetic wave signal into a low-frequency baseband signal. Then the demodulator transmits the low-frequency baseband signal obtained through demodulation to the baseband processor for processing. The low-frequency baseband signal is processed by the baseband processor and then transmitted to the application processor. The application processor outputs a sound signal through an audio device (which is not limited to the speaker 170A, the receiver 170B, and the like), or displays an image or a video on the display 194. In some embodiments, the modem processor may be an independent device. In some other embodiments, the modem processor may be independent of the processor no, and is disposed in a same device as the mobile communication module 150 or another functional module.

The wireless communication module 160 may provide a solution applied to the electronic device 100 for wireless communication such as a wireless local area network (WLAN) (for example, a wireless fidelity (Wi-Fi) network), Bluetooth (BT), a global navigation satellite system (GNSS), frequency modulation (FM), a near field communication (NFC) technology, or an infrared (IR) technology. The wireless communication module 160 may be one or more devices integrating at least one communication processor module. The wireless communication module 160 receives an electromagnetic wave through the antenna 2, performs frequency modulation and filtering on an electromagnetic wave signal, and sends a processed signal to the processor no. The wireless communication module 160 may further receive a to-be-sent signal from the processor no, perform frequency modulation and amplification on the signal, and convert the signal into an electromagnetic wave for radiation through the antenna 2.

In some embodiments, in the electronic device 100, the antenna 1 is coupled to the mobile communication module iso, and the antenna 2 is coupled to the wireless communication module 160, so that the electronic device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite-based augmentation system (SBAS).

The electronic device 100 implements a display function through the GPU, the display 194, the application processor, and the like. The GPU is a microprocessor for image processing, and is connected to the display 194 and the application processor. The GPU is configured to perform mathematical and geometric computation, and render an image. The processor no may include one or more GPUs that execute program instructions to generate or change display information.

The display 194 is configured to display an image, a video, or the like. The display 194 includes a display panel. In some embodiments, the electronic device 100 may include one or N displays 194, where N is a positive integer greater than 1.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some embodiments, the electronic device wo may include one or N cameras 193, where N is a positive integer greater than 1.

The digital signal processor is configured to process a digital signal, and may process another digital signal in addition to the digital image signal. For example, when the electronic device wo selects a frequency, the digital signal processor is configured to perform Fourier transform on frequency energy.

The video codec is configured to compress or decompress a digital video. The electronic device wo may support one or more types of video codecs. In this way, the electronic device wo may play or record videos in a plurality of encoding formats, for example, moving picture experts group (moving picture experts group, MPEG)-1, MPEG-2, MPEG-3, and MPEG-4.

The internal memory 121 may include one or more random access memories (random access memory, RAM) and one or more non-volatile memories (non-volatile memory, NVM). The processor no may directly perform a read or write operation on the random access memory. The random access memory may be configured to store an operating system or an executable program (for example, machine instructions) of another running program, and may be further configured to store data of a user and an application program, and the like. The non-volatile memory may also store an executable program, data of a user and an application program, and the like, and may be loaded to the random access memory in advance, so that the processor no directly performs a read or write operation.

The electronic device 100 may implement an audio function, for example, music play and recording, through the audio module 170, the speaker 170A, the receiver 170B, the microphone 170C, the headset jack 170D, the application processor, and the like.

The audio module 170 is configured to convert digital audio information into analog audio signal output, and is also configured to convert analog audio input into a digital audio signal. The audio module 170 may be further configured to encode and decode an audio signal. In some embodiments, the audio module 170 may be disposed in the processor no, or some functional modules of the audio module 170 are disposed in the processor no.

The speaker 170A, also referred to as a "loudspeaker", is configured to convert an electrical audio signal into a sound signal.

The receiver 170B, also referred to as an "earpiece", is configured to convert an electrical audio signal into a sound signal.

The microphone 170C, also referred to as a "mike" or a "mic", is configured to convert a sound signal into an electrical signal.

The headset jack 170D is used for connecting a wired headset.

The pressure sensor 180A is configured to sense a pressure signal, and may convert the pressure signal into an electrical signal.

The gyro sensor 180B may be configured to determine a motion attitude of the electronic device 100.

The barometric pressure sensor 180C is configured to measure barometric pressure.

The magnetic sensor 180D includes a Hall effect sensor.

The acceleration sensor 180E may detect accelerations in various directions (usually on three axes) of the electronic device 100, and may be further configured to recognize an attitude of the electronic device and used in applications such as landscape/portrait mode switching and a pedometer.

The distance sensor 180F is configured to measure a distance.

The optical proximity sensor 180G may include, for example, a light-emitting diode (LED) and an optical detector, for example, a photodiode.

The ambient light sensor 180L is configured to sense ambient light brightness.

The fingerprint sensor 180H is configured to capture a fingerprint.

The temperature sensor 180J is configured to detect temperature.

The touch sensor 180K is also referred to as a "touch panel".

The button 190 includes a power button, a volume button, and the like. The button 190 may be a mechanical button or a touch button.

The motor 191 may generate a vibration prompt. The motor 191 may be configured to provide an incoming call vibration prompt or a touch vibration feedback.

The indicator 192 may be an indicator light, and may be configured to indicate a charging status and a battery level change, or may be configured to indicate a message, a missed call, a notification, and the like.

The SIM card interface 195 is used for connecting a SIM card.

A software system of the electronic device 100 may use a hierarchical architecture, an event-driven architecture, a microkernel architecture, a micro service architecture, or a cloud architecture. A software architecture of the electronic device 100 is not limited in this embodiment of this application. For example, the software architecture of the electronic device wo may be an Android system with a hierarchical architecture.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

According to the context, the term "when" used in the foregoing embodiments may be interpreted as a meaning of "if", "after", "in response to determining", or "in response to detecting". Similarly, according to the context, the phrase "when it is determined that" or "if (a stated condition or event) is detected" may be interpreted as a meaning of "if it is determined that" or "in response to determining" or "when (a stated condition or event) is detected" or "in response to detecting (a stated condition or event)".

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of processes or functions according to embodiments of this application are generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible to the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

Persons of ordinary skill in the art can understand that all or some of the processes of the methods in embodiments may be implemented by a computer program instructing related hardware. The program may be stored in the computer-readable storage medium. When the program is executed, the processes in the method embodiments may be included. The foregoing storage medium includes any medium that can store program code, such as a ROM, a random access memory RAM, a magnetic disk, or an optical disc.

What is claimed is:

1. A method, comprising:
    obtaining, by an electronic device, to-be-encoded text, wherein the to-be-encoded text comprises N characters, and N is a positive integer;
    determining, by the electronic device from X optional coding modes, a target coding mode for each of the N characters;
    grouping, by the electronic device, the N characters into M character fields based on the target coding mode for each of the N characters, and determining a target coding mode for each of the M character fields, wherein M is less than or equal to N;
    encoding, by the electronic device, the M character fields based on the target coding mode for each of the M character fields to obtain a first binary character string; and
    generating, by the electronic device based on the first binary character string, a two-dimensional code of a version corresponding to a length of the first binary character string.

2. The method according to claim 1, wherein determining, by the electronic device, the target coding mode for each of the N characters from X optional coding modes comprises:
    determining, by the electronic device from the X optional coding modes, one or more candidate coding modes for a first character of the N characters; and
    selecting, by the electronic device from the one or more candidate coding modes, a candidate coding mode with a smallest quantity of coded bits as a target coding mode for the first character.

3. The method according to claim 2, wherein grouping, by the electronic device, the N characters into the M character fields based on the target encoding mode for each of the N characters, and determining the target coding mode for each of the M character fields comprises:
    grouping, by the electronic device into a character field, consecutive adjacent characters corresponding to a same target coding mode among the N characters, to obtain the M character fields; and
    determining, by the electronic device, the target coding mode for each of the M character fields based on a target coding mode for a character in each character field.

4. The method according to claim 3, wherein the M character fields comprise a first character field, the first character field comprises the first character and a second character, the first character and the second character correspond to a same target coding mode, and a target coding mode for the first character field is the same as that for the first character and the second character.

5. The method according to claim 3, wherein the M character fields comprise a second character field, and a quantity of characters in the second character field is greater than or equal to a preset quantity.

6. The method according to claim 3, wherein the M character fields comprise the first character field, and determining, by the electronic device, the target coding mode for each of the M character fields based on the target coding mode for the character in each character field comprises:
    determining, by the electronic device, that the target coding mode for the first character and a second character in the first character field is a first target coding mode; and
    using, by the electronic device, the first target coding mode as the target coding mode for the first character field.

7. The method according to claim 2, wherein grouping, by the electronic device, the N characters into the M character fields based on the target coding modes for the N characters, and determining the target coding mode for each of the M character fields comprises:
    grouping, by the electronic device into a character field, consecutive adjacent characters that correspond to a same target coding mode and whose quantity is greater than a preset quantity among the N characters, to obtain the M character fields; and
    determining, by the electronic device, the target coding mode for each of the M character fields based on a target coding mode for a character in each character field.

8. The method according to claim 2, wherein grouping, by the electronic device, the N characters into the M character fields based on the target coding modes for the N characters, and determining the target coding mode for each of the M character fields comprises:
    starting, by the electronic device, counting from a $1^{st}$ character of the N characters;
    when a $(u-1)^{th}$ character is counted, determining, by the electronic device, that a quantity of characters is greater than or equal to a preset quantity, and when the $(u-1)^{th}$ character and a $u^{th}$ character correspond to different target coding modes, grouping, by the electronic device, the $1^{st}$ character to the $(u-1)^{th}$ character of the N characters into one character field, to obtain the M character fields; and
    determining, by the electronic device, the target coding mode for each of the M character fields based on a target coding mode for a character in each of the M character fields.

9. The method according to claim 1, wherein the first binary character string comprises a second binary character string, the second binary character string is obtained by encoding the first character field, and a second binary character field comprises a mode indicator for the target coding mode for the first character field, a character length indicator for the first character field, and a binary character string obtained by encoding a character in a first character string based on a target coding mode for the first character string.

10. The method according to claim 1, wherein the N characters comprise a numeric character, an uppercase letter character, a lowercase letter character, a special character, or an escape character, and the numeric character, the uppercase letter character, the lowercase letter character, the special character, or the escape character correspond to different target coding modes with smallest quantities of coded bits.

11. The method according to claim 1, wherein the two-dimensional code of the version corresponding to the length of the first binary character string comprises a two-dimensional code of a first version, a two-dimensional code of a second version, a two-dimensional code of a third version, a two-dimensional code of a fourth version, a two-dimensional code of a fifth version, and a two-dimensional code of a sixth version, and the two-dimensional code of the first version, the two-dimensional code of the second version, the two-dimensional code of the third version, the two-dimensional code of the fourth version, the two-dimensional code of the fifth version, and the two-dimensional code of the sixth version have different data capacities.

12. The method according to claim 1, wherein the two-dimensional code is a circular two-dimensional code, the circular two-dimensional code comprises a code region comprising a plurality of concentric circles, and a ring of each of the plurality of concentric circles comprises a plurality of code elements.

13. A method, comprising:
    obtaining, by an electronic device, a to-be-decoded two-dimensional code, wherein the to-be-decoded two-dimensional code indicates first information;
    obtaining, by the electronic device, mode indication information from the to-be-decoded two-dimensional code;
    determining, by the electronic device, a coding mode for the to-be-decoded two-dimensional code from the mode indication information, wherein the electronic device stores one or more mapping relationship tables, and the mapping relationship table comprises the mode indication information and a coding mode corresponding to the mode indication information; and
    decoding, by the electronic device based on the coding mode, the to-be-decoded two-dimensional code to obtain the first information.

14. The method according to claim 13, wherein the to-be-decoded two-dimensional code comprises a code region, and obtaining, by the electronic device, the mode indication information from the to-be-decoded two-dimensional code comprises:
    obtaining, by the electronic device, the mode indication information from a code element that stores the mode indication information in the code region.

15. The method according to claim 14, wherein before obtaining, by the electronic device, the mode indication information from the code element that stores the mode indication information in the code region, the method further comprises:
    obtaining, by the electronic device, version information of the to-be-decoded two-dimensional code, and determining a target version of the to-be-decoded two-dimensional code based on the version information, wherein the target version indicates coordinate information of each storage location in the code region of the to-be-decoded two-dimensional code; and
    determining, by the electronic device based on the coordinate information of each storage location, a binary value corresponding to a storage location occupied by each of a plurality of code elements in the code region of the to-be-decoded two-dimensional code.

16. The method according to claim 15, wherein decoding, by the electronic device, the to-be-decoded two-dimensional code based on the coding mode to obtain the first information comprises:
    decoding, by the electronic device based on the coding mode, the binary value corresponding to the storage location occupied by each of the plurality of code elements in the code region of the to-be-decoded two-dimensional code to obtain the first information.

17. The method according to claim 13, wherein determining, by the electronic device, the coding mode for the to-be-decoded two-dimensional code from the mode indication information comprises:
querying, by the electronic device, the mapping relationship table for the coding mode corresponding to the mode indication information and a quantity of coded bits in the coding mode.

18. The method according to claim 13, wherein the to-be-decoded two-dimensional code comprises one piece of mode indication information and a plurality of pieces of sub-mode indication information, the first information comprises two or more of a numeric character, an uppercase letter character, a lowercase letter character, a special character, and an escape character, and the numeric character, the uppercase letter character, the lowercase letter character, the special character, and the escape character correspond to different target coding modes with smallest quantities of coded bits.

19. The method according to claim 13, wherein the to-be-decoded two-dimensional code is a circular two-dimensional code, the circular two-dimensional code comprises a code region comprising a plurality of concentric circles, and a ring of each of the plurality of concentric circles comprises a plurality of code elements.

20. An electronic device, comprising:
a communication interface;
a non-transitory memory; and
a processor, wherein the communication interface and the non-transitory memory are coupled to the processor, the non-transitory memory is configured to store computer program code, the computer program code comprises computer instructions, and when the processor reads the computer instructions from the non-transitory memory, the electronic device is enabled to:
obtain, by the electronic device, to-be-encoded text, wherein the to-be-encoded text comprises N characters, and N is a positive integer;
determine, by the electronic device from X optional coding modes, a target coding mode for each of the N characters;
group, by the electronic device, the N characters into M character fields based on the target coding mode for each of the N characters, and determining a target coding mode for each of the M character fields, wherein M is less than or equal to N;
encode, by the electronic device, the M character fields based on the target coding mode for each of the M character fields to obtain a first binary character string; and
generate, by the electronic device based on the first binary character string, a two-dimensional code of a version corresponding to a length of the first binary character string.

\* \* \* \* \*